(12) United States Patent
Ishibashi

(10) Patent No.: US 11,988,846 B2
(45) Date of Patent: May 21, 2024

(54) OPTICAL SYSTEM AND OPTICAL APPARATUS INCLUDING THE SAME

(71) Applicant: CANON KABUSHIKI KAISHA, Tokyo (JP)

(72) Inventor: Tomohiko Ishibashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 694 days.

(21) Appl. No.: 17/073,170

(22) Filed: Oct. 16, 2020

(65) Prior Publication Data

US 2021/0124182 A1     Apr. 29, 2021

(30) Foreign Application Priority Data

Oct. 23, 2019   (JP) .................................. 2019-192821

(51) Int. Cl.
| | |
|---|---|
| *G02B 27/58* | (2006.01) |
| *G02B 5/00* | (2006.01) |
| *G02B 9/12* | (2006.01) |
| *G02B 13/18* | (2006.01) |

(52) U.S. Cl.
CPC ............ *G02B 27/58* (2013.01); *G02B 5/005* (2013.01); *G02B 9/12* (2013.01); *G02B 13/18* (2013.01)

(58) Field of Classification Search
CPC .......... G02B 27/58; G02B 5/005; G02B 9/12; G02B 13/18; G02B 13/02; G02B 13/04; G02B 9/64
See application file for complete search history.

(56) References Cited

U.S. PATENT DOCUMENTS

| | | | | |
|---|---|---|---|---|
| 2007/0139792 | A1* | 6/2007 | Sayag ................... | G02B 27/58 359/739 |
| 2013/0206323 | A1* | 8/2013 | Blackburn ............ | G02B 27/58 264/1.7 |
| 2016/0231479 | A1* | 8/2016 | Ito ........................... | G02B 5/20 |
| 2016/0341973 | A1* | 11/2016 | Ida ......................... | G02B 27/58 |
| 2018/0067333 | A1* | 3/2018 | Ishibashi ............... | G02B 27/58 |
| 2019/0064472 | A1* | 2/2019 | Ishibashi ............... | G02B 27/58 |

FOREIGN PATENT DOCUMENTS

| | | |
|---|---|---|
| JP | 2016-218444 A | 12/2016 |
| JP | 2018-049102 A | 3/2018 |
| WO | 2016039147 A1 | 3/2016 |

* cited by examiner

*Primary Examiner* — Cara E Rakowski

(74) *Attorney, Agent, or Firm* — CANON U.S.A., INC. IP Division

(57) ABSTRACT

An optical system includes an aperture stop, a first optical element disposed on one of an object side and an image side of the aperture stop, and a second optical element disposed on the other of the object side and the image side. Each of the first optical element and the second optical element includes an area in which a transmittance changes in a direction perpendicular to an optical axis. The following conditional expressions are satisfied:

$0.60 \leq |m1/a1| < |m2/a2| \leq 1.40,$ $0.40 \leq T1(h1)/T2(h2) < 0.98,$ and $0.30 \leq 2 \times h1/\varphi1 \leq 0.70.$

14 Claims, 9 Drawing Sheets

OPTICAL SYSTEM AND OPTICAL APPARATUS INCLUDING THE SAME

BACKGROUND OF THE DISCLOSURE

Field of the Disclosure

The aspect of the embodiments relates to an optical system, which is preferably used for, for example, optical apparatuses, such as a digital still camera, a digital video camera, a silver halide film camera, and a telescope.

Description of the Related Art

A neutral density (ND) filter that adjusts the amount of transmitted light is known as an optical element used for an optical apparatus. In particular, in order to reduce variations in the sharpness of the outline of a defocused image (blurred image) (in order to obtain an apodization effect), gradation ND filters (apodization filters) having different transmittances for each area are used. International Patent Publication No. WO 2016/039147 discusses a technique in which an optical system is provided with an optical element having a transmittance distribution in order to obtain the apodization effect.

However, in the technique discussed in International Patent Publication No. WO 2016/039147, the height of each of an axial ray and an off-axis ray, which pass through the optical element including the transmittance distribution, is not taken into consideration. If the transmittance distribution of the optical element is not appropriate for the height of each of the axial ray and the off-axis ray, it may be difficult to obtain the apodization effect with high rotational symmetry.

SUMMARY OF THE DISCLOSURE

The aspect of the embodiments is directed to obtaining an apodization effect with high rotational symmetry.

According to an aspect of the embodiments, an optical system includes an aperture stop, a first optical element disposed on one of an object side and an image side of the aperture stop, and a second optical element disposed on the other of the object side and the image side. Each of the first optical element and the second optical element includes an area in which a transmittance changes in a direction perpendicular to an optical axis. The following conditional expressions are satisfied:

$$0.60 \le |m1/a1| < |m2/a2| \le 1.40,$$

$$0.40 \le T1(h1)/T2(h2) < 0.98, \text{ and}$$

$$0.30 \le 2 \times h1/\varphi1 \le 0.70.$$

where a1 is a maximum height from the optical axis of an axial ray in the first optical element, a2 is a maximum height from the optical axis of an axial ray in the second optical element, m1 is a maximum height from the optical axis of an outermost off-axis ray in the first optical element, m2 is a maximum height from the optical axis of an outermost off-axis ray in the second optical element, T1(h) is a transmittance of the first optical element at a height h from the optical axis, T2(h) is a transmittance of the second optical element at the height h from the optical axis, $\varphi1$ is an effective diameter of the first optical element, $\varphi2$ is an effective diameter of the second optical element, and ray heights h1 and h2 satisfy $h1/\varphi1 = h2/\varphi2$.

Further features of the disclosure will become apparent from the following description of exemplary embodiments with reference to the attached drawings.

DESCRIPTION OF THE EMBODIMENTS

Figure 1:
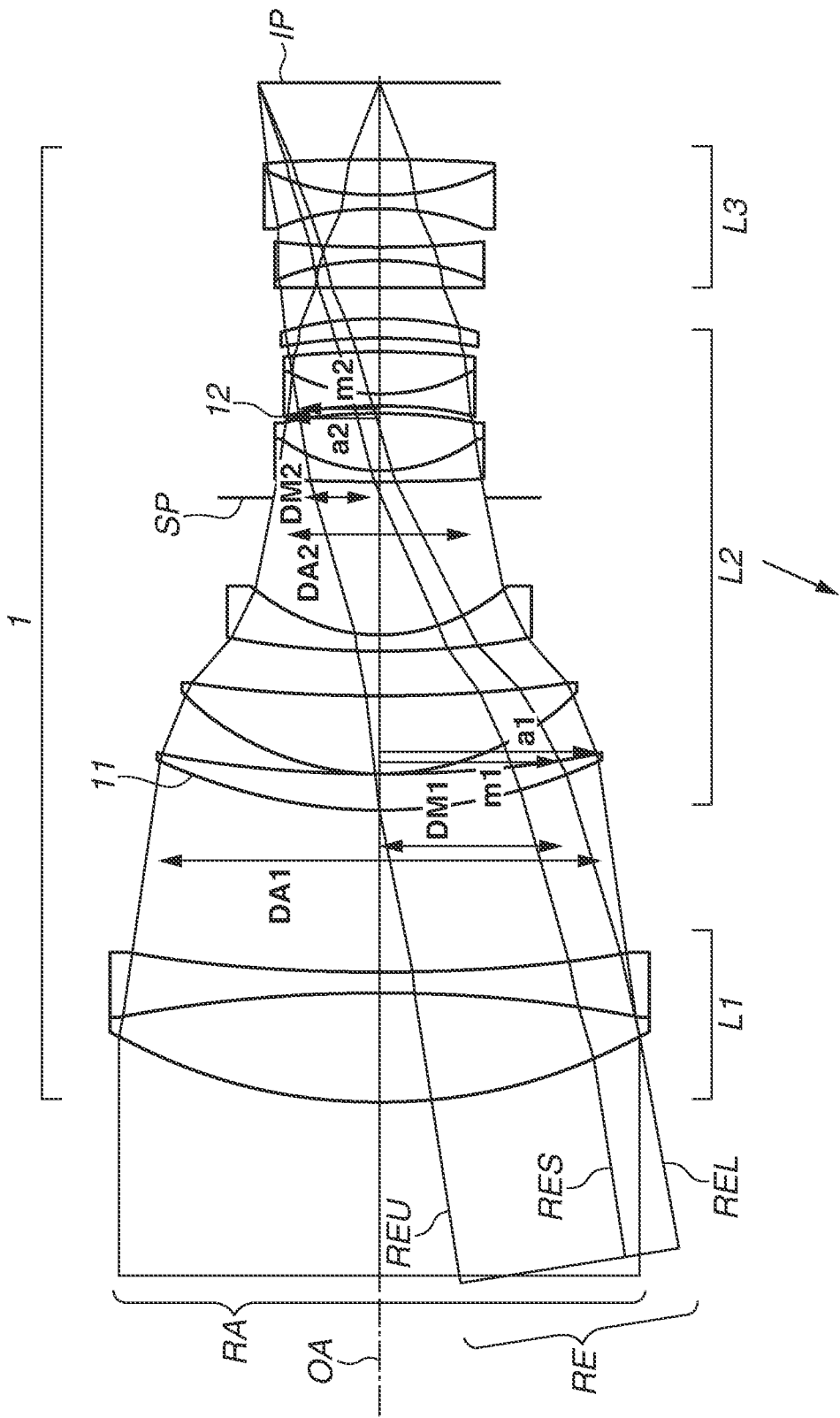
FIG. 1 is a sectional view of an optical system according to a first exemplary embodiment.

Exemplary embodiments of the disclosure will be descried below with reference to the drawings. The drawings may be illustrated in sizes different from the actual sizes for convenience. Further, in the drawings, the same members are denoted by the same reference numerals, and redundant descriptions thereof are omitted.

FIGS. 1 to 8 are sectional views of optical systems according to first to eighth exemplary embodiments, respectively, in a state where focus is at infinity. FIGS. 1 to 8 each illustrate a meridional section including an optical axis OA of the corresponding optical system. In the case of using each of the optical systems according to the exemplary embodiments as an image capturing optical system for a digital video camera or a digital camera, an image sensor, such as a charge-coupled device (CCD) sensor or a complementary metal-oxide semiconductor (CMOS) sensor, is disposed on an image plane IP. When each of the optical systems according to the exemplary embodiments is used as an image capturing optical system for a silver halide film camera, a film is disposed on the image plane IP. Each arrow illustrated in FIGS. 1 to 8 indicates a movement locus of a lens unit (focusing unit) that moves in focusing from an infinite distance to a closest distance. A lens unit with no arrow is immovable during focusing.

An optical system 1 according to the first exemplary embodiment will now be described with reference to FIG. 1.

The optical system 1 according to the first exemplary embodiment includes an aperture stop SP, a first optical element 11, and a second optical element 12. The first optical element 11 is disposed on one of an object side (left side) and an image side (right side) of the aperture stop SP. The second optical element 12 is disposed on the other of the object side and the image side. Each of the first optical element 11 and the second optical element 12 includes an area (transmittance distribution area) in which a transmittance changes in a direction (first direction) perpendicular to the optical axis OA, thereby achieving an apodization effect. As the transmittance distribution area, for example, an area having such a transmission distribution that the transmittance continuously decreases toward a peripheral area from the center of each optical element can be adopted. However, an area in which the transmittance is constant may be provided at the center of each optical element, as needed.

Such a transmittance distribution area can be obtained by forming an optical material that absorbs or reflects light, or by forming a film on a substrate. In this case, a medium containing a substance, such as colored glass, which absorbs light, may be adopted as the optical material, and a transmittance distribution may be formed by changing the thickness of the optical material depending on the position thereof, or by partially changing the density of the substance. Alternatively, the transmittance distribution area may be formed by depositing an optical material on a substrate by vacuum deposition, or by coating a photosensitive material, such as silver salt particles, on a substrate and exposing the photosensitive material to light. Examples of the optical material include materials having properties, such as thermosetting properties, thermoplastic properties, or photocuring properties. The substrate is not limited to a substrate having a curved surface, such as a lens, but instead, a flat-plate-like substrate or a film-like substrate may be used.

An electrochromic element that generates a transmittance distribution by application of a voltage may be used as at least one of the first optical element 11 and the second optical element 12. In this case, the transmittance distribution of the electrochromic element varies depending on the voltage to be applied. The electrochromic element may be configured to obtain the transmittance distribution that satisfies each conditional expression to be described below at a certain voltage.

To reduce variations in the sharpness of the outline of a blurred image as described above, it may be preferable to achieve a light amount distribution in which the amount of light smoothly decreases in the vicinity (edge portion) of the outline of the blurred image. The optical system 1 according to the first exemplary embodiment includes the first optical element 11 and the second optical element 12, which include the transmittance distribution area, thereby achieving such a preferable light amount distribution. On the other hand, a light amount distribution in which the amount of light increases in the vicinity of the outline of the blurred image is not preferable because the outline of the blurred image is emphasized. The term "blurred image" used herein does not refer to a blurred image generated due to a motion of an object (subject) or a camera shake caused by a user, but instead refers to an image (defocused image) formed at a position away from a focal plane of an image capturing optical system by a distance corresponding to a focal depth or more.

The reason will now be described that the respective optical elements, which have a transmittance distribution, are disposed on the object side (light incident side) and the image side (light emission side) of the aperture stop SP in the optical system 1 according to the first exemplary embodiment.

In a general image capturing optical system, the diameter of rays to be focused on the image plane IP gradually decreases in a direction in which an image forming point is away from the optical axis OA. In other words, the diameter of rays decreases as an image height at the image forming point increases. This is because off-axis rays are blocked by an end of an optical element, a holding member, such as a lens barrel or a press ring, an aperture stop, a flare cutter, or the like. This phenomenon is called vignetting. In such an image capturing optical system, transition areas in any section perpendicular to the optical axis of rays to be focused at each image height are different from each other. Accordingly, if the image capturing optical system is provided with only one optical element having a transmittance distribution area, a sufficient light amount distribution cannot be provided for rays with a high image height. As a result, the light amount distribution may greatly vary depending on the image height, or the light amount distribution may become asymmetric in a meridional direction.

Referring to FIG. 1, outermost off-axis rays RE which are rays with a highest image height at the image forming point (meridional rays corresponding to a maximum angle of view of the optical system 1) will now be considered. On the object side of the aperture stop SP, an overline REU of the outermost off-axis rays RE passes through a position closer to the optical axis OA than an underline REL. Accordingly, if the optical element having a transmittance distribution is provided only on the object side of the aperture stop SP, the amount of light reduction of the overline REU of the outermost off-axis rays RE due to the optical element is smaller than the amount of light reduction of the underline REL of the outermost off-axis rays RE. On the other hand, on the image side of the aperture stop SP, the underline REL passes through a position closer to the optical axis OA than the overline REU. Therefore, if the optical element having a transmittance distribution is provided only on the image side of the aperture stop SP, the amount of light reduction of the underline REL is smaller than the amount of light reduction of the overline REU.

Specifically, when only one optical element having a transmittance distribution is provided, the light amount distribution of the outermost off-axis rays RE is rotationally asymmetrical. Therefore, the use of only one optical element having a transmittance distribution makes it difficult to effectively provide the apodization effect for the rays to be focused at each image height.

On the other hand, when the respective optical elements each having a transmittance distribution are provided on the object side and the image side of the aperture stop SP, the light amount distributions provided by the respective optical elements are superimposed. Accordingly, the rotational asymmetry of the light amount distribution caused when only one optical element having a transmittance distribution is provided can be reduced. Therefore, the provision of the respective optical elements each having a transmittance distribution on the object side and the image side of the aperture stop SP makes it possible to provide a favorable apodization effect for the rays to be focused at each image height.

In other words, when a maximum height from the optical axis OA of the outermost off-axis ray in the first optical element 11 is represented by m1 and a maximum height from the optical axis OA of the outermost off-axis ray in the second optical element 12 is represented by m2, the first optical element 11 and the second optical element 12 may be disposed such that the following Conditional Expression (1) is satisfied. The term "height" used herein refers to a distance from the optical axis OA in a direction perpendicular to the optical axis OA. A favorable apodization effect can be provided for the rays to be focused at each image height as described above by disposing one or more optical elements on each of the object side and the image side of the aperture stop SP so as not to exceed an upper limit of Conditional Expression (1).

$$m1 \times m2 < 0 \qquad (1)$$

Next, the relationship between the rotational symmetry of the apodization effect and the height from the optical axis of each of the outermost off-axis rays RE and axial rays RA at the positions of the first optical element 11 and the second optical element 12 will be described.

A principal ray RES will now be considered that passes through an intersection (center of an opening of the aperture stop SP) between the aperture stop SP and the optical axis OA in the outermost off-axis rays RE. To obtain an apodization effect rotationally symmetrical to the principal ray RES, the transmittance at a position where the principal ray RES passes in the first optical element 11 only needs to be set to be substantially equal to the transmittance at a position where the principal ray RES passes in the second optical element 12. To obtain a uniform apodization effect in a range from axial rays to outermost off-axis rays, the ratio between the height of a ray (axial ray) included in the axial rays and the height of a ray (outermost off-axis ray) included in the outermost off-axis rays in the first optical element 11 only needs to be set to be substantially equal to that in the second optical element 12. However, in a general optical system, it is not always possible to dispose optical elements each having a transmittance distribution at a position where the ratio between the height of the axial ray and the height of the outermost off-axis ray in one of the optical elements is substantially equal to that in the other optical element.

Accordingly, in the optical systems according to the exemplary embodiments, the transmittance distributions of the first and second optical elements disposed on the object side and the image side of the aperture stop SP are set to be different from each other, thereby achieving the apodization effect with high rotational symmetry. For example, in the optical system 1 according to the first exemplary embodiment, the ratio of the height of the outermost off-axis ray to the height of the axial ray in the second optical element 12 is larger than that in the first optical element 11. Accordingly, the transmittance distribution in which the transmittance of the first optical element 11 is lower than the transmittance of the second optical element 12 makes it possible to enhance the rotational symmetry of the apodization effect.

Assume herein that the maximum height from the optical axis OA of the axial ray in the first optical element 11 is represented by a1, the maximum height from the optical axis OA of the axial ray in the second optical element 12 is represented by a2, the transmittance of the first optical element 11 at a height h from the original axis OA is represented by T1(h), the transmittance of the second optical element 12 at the height h from the optical axis OA is represented by T2(h), an effective diameter of the first optical element 11 is represented by $\varphi1$, and an effective diameter of the second optical element 12 is represented by $\varphi2$. In this case, the optical systems according to the exemplary embodiments satisfy the following Conditional Expressions (2) to (4), where h1 and h2 each represent a ray height that satisfy $h1/\varphi1=h2/\varphi2$ when the ratio of the ray height to the effective diameter of the first optical element matches the ratio of the ray height to the effective diameter of the second optical element.

$$0.60 \leq |m1/a1| < |m2/a2| \leq 1.40 \tag{2}$$

$$0.40 \leq T1(h1)/T2(h2) < 0.98 \tag{3}$$

$$0.30 \leq 2 \times h1/\varphi1 \leq 0.70 \tag{4}$$

If the height of the outermost off-axis ray becomes relatively low so as to fall below a lower limit of Conditional Expression (2), a sufficient apodization effect for the off-axis ray cannot be obtained, so that the difference between the apodization effects for each image height increases. If the height of the axial ray becomes relatively low so as to exceed an upper limit of Conditional Expression (2), a sufficient apodization effect for the axial ray cannot be obtained, so that the difference between the apodization effects for each image height increases.

If the transmittance distribution is set to satisfy Conditional Expression (3) in the area of the ray height that satisfies Conditional Expression (4), the apodization effect with high rotational symmetry can be obtained. If the transmittance of the first optical element 11 decreases so as to fall below a lower limit of Conditional Expression (3), the apodization effect obtained by the first optical element 11 is excessive, so that the symmetry of the transmittance distribution in the meridional section decreases. If the transmittance of the first optical element 11 increases so as to exceed an upper limit of Conditional Expression (3), the apodization effect obtained by the first optical element 11 is not sufficient, so that the symmetry of the transmittance distribution with respect to the off-axis ray in the meridional section is lowered. The transmittance of an area with a ray height decreased so as to fall below a lower limit of Conditional Expression (4) has no effect on the sharpness of the outline of a blurred image. The transmittance of an area with a ray height increased so as to exceed an upper limit of Conditional Expression (4) has no effect on the sharpness of an intermediate area of a blurred image.

The numerical range of Conditional Expression (2) is preferably expressed by the following Conditional Expressions (2a) to (2d) in this order.

$$0.70 \leq |m1/a1| < |m2/a2| \leq 1.20 \tag{2a}$$

$$0.75 \leq |m1/a1| < |m2/a2| \leq 1.10 \tag{2b}$$

$$0.80 \leq |m1/a1| < |m2/a2| \leq 0.98 \tag{2c}$$

$$0.80 \leq |m1/a1| < |m2/a2| \leq 0.94 \tag{2d}$$

The numerical range of Conditional Expression (3) is preferably expressed by the following Conditional Expressions (3a) to (3c) in this order.

$$0.55 \leq T1(h1)/T2(h2) < 0.92 \tag{3a}$$

$$0.65 \leq T1(h1)/T2(h2) < 0.85 \tag{3b}$$

$$0.75 \leq T1(h1)/T2(h2) < 0.90 \tag{3c}$$

The numerical range of Conditional Expression (4) is preferably expressed by the following Conditional Expressions (4a) to (4b) in this order.

$$0.50 \leq 2 \times h1/\varphi1 \leq 0.70 \tag{4a}$$

$$0.60 \leq 2 \times h1/\varphi1 \leq 0.70 \tag{4b}$$

When a refractive index with respect to a d-line of the (substrate of) first optical element 11 is represented by n1 and a refractive index with respect to a d-line of the (substrate of) second optical element 12 is represent by n2, it is desirable to satisfy the following Conditional Expression (5).

$$|n1-n2| \leq 0.32 \tag{5}$$

If the difference between the refractive index of the first optical element 11 and the refractive index of the second optical element 12 increases so as to exceed an upper limit of Conditional Expression (5), it is difficult to achieve favorable absorption characteristics and favorable anti-reflection characteristics using a common film configuration for each optical element.

The numerical range of Conditional Expression (5) is preferably expressed by the following Conditional Expressions (5a) and (5b) in this order.

$$|n1-n2| \leq 0.20 \quad (5a)$$

$$|n1-n2| \leq 0.07 \quad (5b)$$

Further, the symmetry of the transmittance distribution in the meridional section of the off-axis rays can be enhanced by appropriately determining the ratio of the transmittance at the position of the effective diameter of each optical element. Accordingly, in order to further enhance the rotational symmetry of the apodization effect, it is desirable to satisfy the following Conditional Expression (6).

$$0.80 \leq T1(\varphi1/2)/T2(\varphi2/2) < 1.20 \quad (6)$$

If the transmittance at the position of the effective diameter of the first optical element 11 decreases so as to fall below a lower limit of Conditional Expression (6), the apodization effect obtained by the first optical element 11 is excessive, so that the symmetry of the transmittance distribution in the meridional section is lowered. If the transmittance of the first optical element 11 increases so as to exceed an upper limit of Conditional Expression (6), the apodization effect obtained by the first optical element 11 is not sufficient, so that the symmetry of the transmittance distribution in the meridional section with respect to the off-axis rays is lowered.

The numeral range of Conditional Expression (6) is preferably expressed by the following Conditional Expressions (6a) and (6b) in this order.

$$0.83 \leq T1(\varphi1/2)/T2(\varphi2/2) < 1.10 \quad (6a)$$

$$0.86 \leq T1(\varphi1/2)/T2(\varphi2/2) < 1.05 \quad (6b)$$

Further, the symmetry of the transmittance distribution for each ray can be enhanced by appropriately determining the height of each of the axial ray and the outermost off-axis ray in each optical element. Accordingly, in order to further enhance the rotational symmetry of the apodization effect, it is desirable to satisfy the following Conditional Expression (7).

$$0 < (|m1/a1|-1) \times (|m2/a2|-1) \quad (7)$$

If there is a difference in the ratio between the ray height of the axial ray and the ray height of the outermost off-axis ray in each optical element so as to fall below a lower limit of Conditional Expression (7), there is a difference between the transmittance distribution of the axial rays and the transmittance distribution of the outermost off-axis rays, so that the rotational symmetry of the apodization effect is lowered.

Similarly, in order to further enhance the symmetry of the apodization effect, it is desirable to satisfy the following Conditional Expression (8).

$$0.80 \leq |m1/a1|/|m2/a2| < 1.00 \quad (8)$$

If the ratio of the height of the outermost off-axis ray to the height of the axial ray in the first optical element 11 decreases so as to fall below a lower limit of Conditional Expression (8), the difference between a maximum value and a minimum value of the transmittance distribution obtained by the first optical element 11 decreases, which makes it difficult to obtain a sufficient apodization effect. If the ratio of the height of the outermost off-axis ray to the height of the axial ray in the second optical element 12 decreases so as to exceed an upper limit of Conditional Expression (8), the difference between a maximum value and a minimum value of the transmittance distribution obtained by the second optical element 12 decreases, which makes it difficult to obtain a sufficient apodization effect.

The numerical range of Conditional Expression (8) is preferably expressed by the following Conditional Expressions (8a) to (8c) in this order.

$$0.80 \leq |m1/a1|/|m2/a2| \leq 0.99 \quad (8a)$$

$$0.84 \leq |m1/a1|/|m2/a2| \leq 0.98 \quad (8b)$$

$$0.88 \leq |m1/a1|/|m2/a2| \leq 0.91 \quad (8c)$$

In order to further enhance the symmetry of the apodization effect, it is desirable to satisfy the following Conditional Expressions (9) and (10).

$$0.50 \leq |m1/a1| < 1.00 \quad (9)$$

$$0.50 \leq |m2/a2| < 1.00 \quad (10)$$

If the height of the outermost off-axis ray is lower than the height of the axial ray in each optical element so as to fall below a lower limit of each of Conditional Expressions (9) and (10), the difference between a maximum value and a minimum value of the transmittance distribution in the meridional section with respect to the outermost off-axis ray decreases, which makes it difficult to obtain a sufficient apodization effect. If the height of the outermost off-axis ray is higher than the height of the axial ray of each optical element so as to exceed an upper limit of each of Conditional Expressions (9) and (10), the difference between a maximum value and a minimum value of the transmittance distribution for the axial ray decreases, which makes it difficult to obtain a sufficient apodization effect.

The numerical range of Conditional Expression (9) is preferably expressed by the following Conditional Expressions (9a) to (9c) in this order.

$$0.60 \leq |m1/a1| < 0.94 \quad (9a)$$

$$0.70 \leq |m1/a1| < 0.88 \quad (9b)$$

$$0.80 \leq |m1/a1| < 0.84 \quad (9c)$$

The numerical range of Conditional Expression (10) is preferably expressed by the following Conditional Expressions (10a) to (10c) in this order.

$$0.70 \leq |m2/a2| < 0.98 \quad (10a)$$

$$0.80 \leq |m2/a2| < 0.96 \quad (10b)$$

$$0.90 \leq |m2/a2| < 0.94 \quad (10c)$$

Further, the symmetry of the sharpness of the outline of a blurred image can be enhanced by appropriately determining the transmittance at the position of the effective diameter of each of the first optical element 11 and the second optical element 12. Accordingly, in order to further enhance the symmetry of the apodization effect, it is desirable to satisfy the following Conditional Expressions (11) and (12).

$$0.000 \leq T1(\varphi1/2) \leq 0.125 \quad (11)$$

$$0.000 \leq T2(\varphi2/2) \leq 0.125 \quad (12)$$

If the transmittance of each optical element increases so as to exceed an upper limit of each of Conditional Expressions (11) and (12), the transmittance at the outline portion of the blurred image does not decrease, which makes it difficult to obtain a sufficient apodization effect. In addition, the difference between a maximum value and a minimum value of the transmittance distribution in a sagittal section for the off-axis ray decreases, which makes it difficult to obtain the apodization effect with high rotational symmetry. Since the sign of the transmittance always indicates positive, the transmittance does not fall below a lower limit of each of Conditional Expressions (11) and (12). The apodization effect that increases as the value of the middle side of each of Conditional Expressions (11) and (12) decreases can be obtained. However, since it is difficult to produce optical elements with an extremely small transmittance, it is more preferable to appropriately set the transmittance of each optical element in consideration of the difficulty level of production.

Specifically, the numerical range of Conditional Expression (11) is preferably expressed by the following Conditional Expressions (11a) to (11c) in this order.

$$0.008 \leq T1(\varphi1/2) < 0.088 \quad (11a)$$

$$0.016 \leq T1(\varphi1/2) < 0.063 \quad (11b)$$

$$0.031 \leq T1(\varphi1/2) < 0.050 \quad (11c)$$

The numerical range of Conditional Expression (12) is preferably expressed by the following Conditional Expressions (12a) to (12c) in this order.

$$0.008 \leq T2(\varphi2/2) < 0.088 \quad (12a)$$

$$0.016 \leq T2(\varphi2/2) < 0.063 \quad (12b)$$

$$0.031 \leq T2(\varphi2/2) < 0.050 \quad (12c)$$

Further, the diameter (ray diameter) of each ray at the position of the aperture stop SP in the meridional section is appropriately determined, thereby obtaining the transmittance distribution with high symmetry while achieving a reduction in the size and weight of the optical system. Accordingly, when the diameters of the axial ray and the outermost off-axis ray at the position of the aperture stop SP in the meridional section are represented by Da and Dm, respectively, it is desirable to satisfy the following Conditional Expression (13).

$$0.20 \leq Dm/Da \leq 0.70 \quad (13)$$

If the diameter of the outermost off-axis rays decreases so as to fall below a lower limit of Conditional Expression (13), it may be desirable to form a steep transmittance distribution to obtain the apodization effect. In this case, the transmittance distribution for the axial rays can be formed only in the vicinity of the outline of a blurred image, and thus a sufficient apodization effect cannot be obtained. To increase the diameter of the outermost off-axis rays so as to exceed an upper limit of Conditional Expression (13), it may be desirable to increase the diameter of each of the first optical element 11 and the second optical element 12 so as to prevent the outermost off-axis rays from causing vignetting. This may lead to an increase in the size and weight of the optical system.

The numerical range of Conditional Expression (13) is preferably expressed by the following Conditional Expressions (13a) to (13c) in this order.

$$0.24 \leq Dm/Da \leq 0.58 \quad (13a)$$

$$0.28 \leq Dm/Da \leq 0.47 \quad (13b)$$

$$0.30 \leq Dm/Da \leq 0.42 \quad (13c)$$

The rotational symmetry of the apodization effect can also be enhanced by satisfying Conditional Expression (2) and the following Conditional Expressions (14) to (17), instead of satisfying Conditional Expressions (2) to (4).

$$0.70 \leq |m1/a1|/|m2/a2| \leq 0.95 \quad (14)$$

$$0.40 \leq T1(\varphi1/4) < 0.90 \quad (15)$$

$$0.40 \leq T2(\varphi2/4) < 0.90 \quad (16)$$

$$0.001 \leq T1(\varphi1/2)/T2(\varphi2/2) < 0.400 \quad (17)$$

If the ratio of the height of the outermost off-axis ray to the height of the axial ray in the first optical element 11 decreases so as to fall below a lower limit of Conditional Expression (14), the difference between a maximum value and a minimum value of the transmittance distribution obtained by the first optical element 11 decreases, which makes it difficult to obtain a sufficient apodization effect. If the ratio of the height of the outermost off-axis ray to the height of the axial ray in the second optical element 12 decreases so as to exceed an upper limit of Conditional Expression (14), the difference between a maximum value and a minimum value of the transmittance distribution obtained by the second optical element 12 decreases, which makes it difficult to obtain a sufficient apodization effect.

If the transmittance in a middle band ($\varphi2/4$) of the first optical element 11 decreases so as to fall below a lower limit of Conditional Expression (15), the size of the blurred image decreases and the transmittance is relatively rapidly changed with respect to the size of the blurred image, which makes it difficult to obtain a sufficient apodization effect. If the transmittance in the middle band of the first optical element 11 increases so as to exceed an upper limit of Conditional Expression (15), the transmittance distribution at an outer peripheral portion of the first optical element 11 is relatively rapidly changed, which makes it difficult to obtain a sufficient apodization effect.

If the transmittance in the middle band ($\varphi2/4$) of the second optical element 12 decreases so as to fall below a lower limit of Conditional Expression (16), the size of the blurred image decreases and the transmittance is relatively rapidly changed with respect to the size of the blurred image, which makes it difficult to obtain a sufficient apodization effect. If the transmittance in the middle band of the second optical element 12 increases so as to exceed an upper limit of Conditional Expression (16), the transmittance distribution at an outer peripheral portion of the second optical element 12 is relatively rapidly changed, which makes it difficult to obtain a sufficient apodization effect.

If the transmittance at the position of the effective diameter of the second optical element 12 increases so as to fall below a lower limit of Conditional Expression (17), a sufficient apodization effect cannot be obtained by the second optical element 12, and thus the symmetry of the transmittance distribution in the meridional section with respect to the off-axis rays is lowered. If the transmittance of the first optical element 11 increases so as to exceed an upper limit of Conditional Expression (17), a sufficient apodization effect cannot be obtained by the first optical element 11, and thus the symmetry of the transmittance distribution in the meridional section with respect to the off-axis rays is lowered.

The numerical range of Conditional Expression (14) is preferably expressed by the following Conditional Expressions (14a) to (14c) in this order.

$$0.74 \leq |m1/a1|/|m2/a2| \leq 0.92 \quad (14a)$$

$$0.78 \leq |m1/a1|/|m2/a2| \leq 0.90 \quad (14b)$$

$$0.81 \leq |m1/a1|/|m2/a2| \leq 0.85 \quad (14c)$$

The numerical range of Conditional Expression (15) is preferably expressed by the following Conditional Expressions (15a) to (15c) in this order.

$$0.60 \leq T1(\varphi1/4)<0.80 \quad (15a)$$

$$0.65 \leq T1(\varphi1/4)<0.76 \quad (15b)$$

$$0.70 \leq T1(\varphi1/4)<0.73 \quad (15c)$$

The numerical range of Conditional Expression (16) is preferably expressed by the following Conditional Expressions (16a) to (16c) in this order.

$$0.60 \leq T2(\varphi2/4)<0.90 \quad (16a)$$

$$0.68 \leq T2(\varphi2/4)<0.86 \quad (16b)$$

$$0.75 \leq T2(\varphi2/4)<0.84 \quad (16c)$$

The numerical range of Conditional Expression (17) is preferably expressed by the following Conditional Expressions (17a) to (17c) in this order.

$$0.01 \leq T1(\varphi1/2)/T2(\varphi2/2)<0.38 \quad (17a)$$

$$0.02 \leq T1(\varphi1/2)/T2(\varphi2/2)<0.35 \quad (17b)$$

$$0.03 \leq T1(\varphi1/2)/T2(\varphi2/2)<0.32 \quad (17c)$$

The rotational symmetry of the apodization effect can also be enhanced by satisfying the following Conditional Expressions (18) to (22), instead of satisfying Conditional Expressions (2) to (4). In this case, assume that a maximum diameter (maximum diameter in the direction perpendicular to the optical axis OA) of axial rays in the meridional section of the first optical element 11 is represented by DA1, the maximum diameter of axial rays in the meridional section of the second optical element 12 is represented by DA2, the maximum diameter of outermost off-axis rays in the meridional section of the first optical element 11 is represented by DM1, the maximum diameter of outermost off-axis rays in the meridional section of the second optical element 12 is represented by DM2, and h11 and h12 represent ray heights that satisfy h11<h12.

$$DM2/DA2<DM1/DA1 \quad (18)$$

$$T1(h11)-T1(h12)<T2(h21)-T2(h22) \quad (19)$$

$$0.70 \leq 2 \times h11/\varphi1 = 2 \times h21/\varphi2 < 0.98 \quad (20)$$

$$0.70 \leq 2 \times h12/\varphi1 = 2 \times h22/\varphi2 < 0.98 \quad (21)$$

Conditional Expression (18) indicates that the ratio of the diameter of the outermost off-axis rays to the diameter of the axial rays in the meridional section of the first optical element 11 is larger than that in the second optical element 12. If the first optical element 11 and the second optical element 12 are each disposed at a position that satisfies Conditional Expression (18), the symmetry of the transmittance distribution in the meridional section with respect to the off-axis rays can be enhanced by setting the variation in the transmittance distribution in the second optical element 12 to be larger than that in the first optical element 11. In addition, the symmetry of the apodization effect can be enhanced by appropriately determining the variation in the transmittance distribution at the outer peripheral portion that satisfies Conditional Expressions (20) and (21) in each optical element.

Accordingly, in the optical system that satisfies Conditional Expressions (18), (20), and (21), the symmetry of the apodization effect in the meridional section with respect to the outermost off-axis ray can be enhanced by satisfying Conditional Expression (19).

If parameters in each of the conditional expressions described above vary depending on an aperture value (F-value) or an in-focus position, the effect of each conditional expression can be obtained by satisfying each conditional expression when at least the aperture stop SP is open and the optical system is in focus at infinity.

The optical systems according to the exemplary embodiments will be described in more detail below.

As illustrated in FIG. 1, the optical system 1 according to the first exemplary embodiment is composed of a first lens unit L1 having a positive refractive power, a second lens unit L2, which includes the aperture stop SP and has a positive refractive power, and a third lens unit L3 having a negative refractive power. The first lens unit L1, the second lens unit L2, and the third lens unit L3 are disposed in order from the object side to the image side. The second lens unit L2 includes the first optical element 11 and the second optical element 12.

The first optical element 11 corresponds to a third lens (third lens counted from the object side). A thin film having light absorption properties is formed on the object-side surface of the third lens, thereby obtaining the transmittance distribution. The second optical element 12 corresponds to an eighth lens. A thin film having light absorption properties is formed on the object-side surface of the eighth lens, thereby obtaining the transmittance distribution. The transmittance of each of the first optical element 11 and the second optical element 12 changes such that the transmittance monotonously decreases toward a peripheral area from the center.

In the optical system 1, the symmetry of the apodization effect of the off-axis rays is enhanced by satisfying Conditional Expressions (2) to (4) described above. Specifically, the maximum image height (outermost off-axis image height) of the optical system 1 in the meridional section is ±21.64 mm, and the difference in transmittance between areas through which the outermost off-axis rays that reach the corresponding maximum image height pass in the entire system of the optical system 1 is 0.7%. On the other hand, when the first optical element 11 and the second optical element 12 include the same transmittance distribution (comparative example), the difference in transmittance is 4.7%. Therefore, according to the optical system 1, the difference in transmittance with respect to each maximum image height can be sufficiently reduced and the apodization effect with high rotational symmetry can be achieved.

The optical system 1 causes the second lens unit L2 to move to the object side as indicated by an arrow in FIG. 1, thereby enabling focusing from an infinite distance to a closest distance. In this case, the second lens unit L2 serving as a focusing unit is provided with the first optical element 11 and the second optical element 12, thereby suppressing variations in the ray height of each of the axial ray and the outermost off-axis ray in association with focusing, and reducing variations in the apodization effect in association with focusing. During focusing, the first lens unit L1 and the third lens unit L3 are immovable.

The material of the substrate of each of the first optical element 11 and the second optical element 12 is made of inorganic glass and the difference between the refractive indices of the materials with respect to the d-line is small, i.e., 0.040. Consequently, excellent absorption characteristics and excellent anti-reflection characteristics can be achieved using a common film configuration. The optical system 1 according to the first exemplary embodiment is a coaxial system in which the center of curvature of each optical surface and the central position of the image plane IP are disposed on the optical axis. However, a non-coaxial system may be used, as needed, as the optical system 1.

Figure 2:
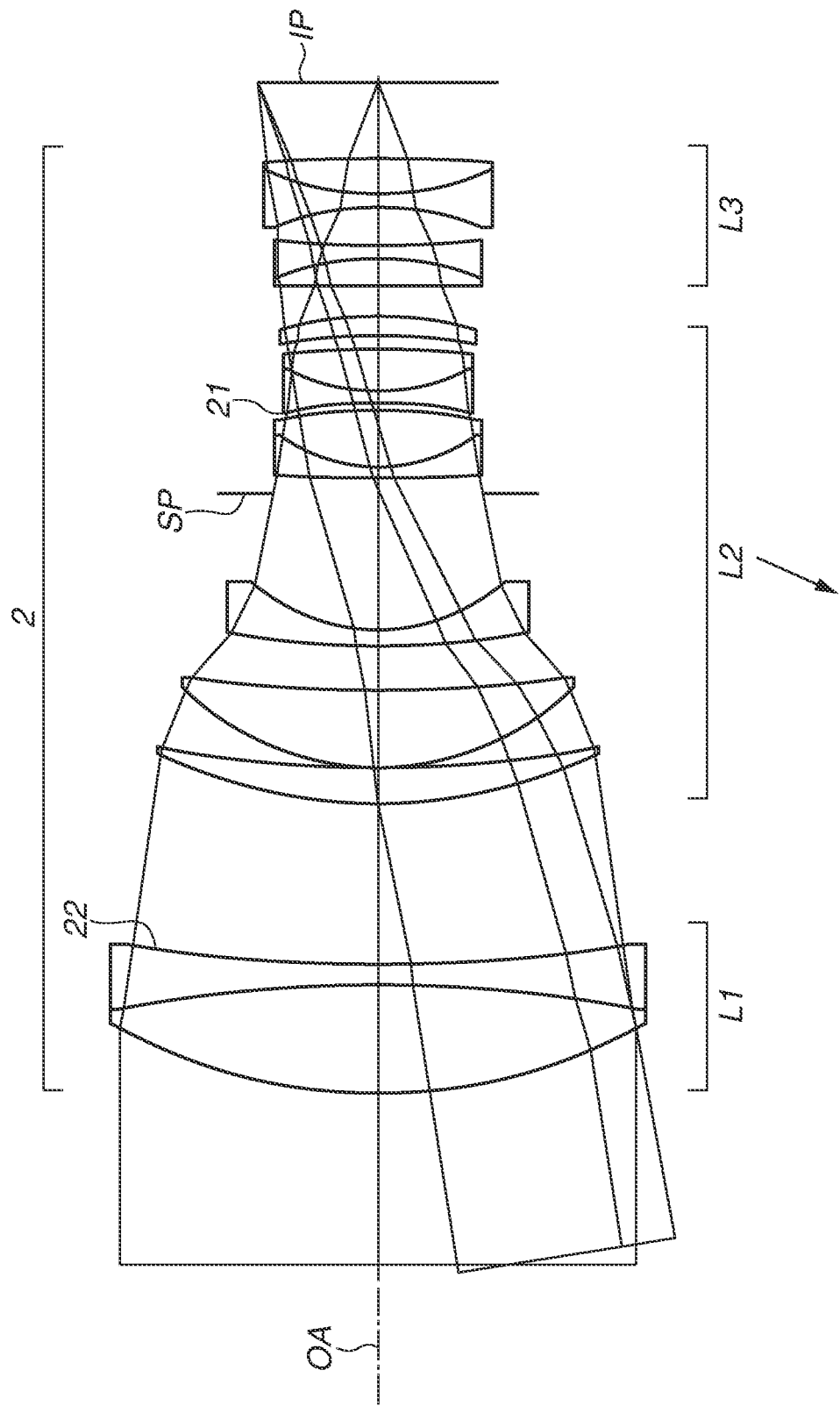
FIG. 2 is a sectional view of an optical system according to a second exemplary embodiment.

As illustrated in FIG. 2, an optical system 2 according to the second exemplary embodiment has a configuration similar to that of the optical system 1 according to the first exemplary embodiment, except for the positions of the first and second optical elements. In the optical system 2, the first lens unit L1 includes a second optical element 22, and the second lens unit L2 includes a first optical element 21.

The first optical element 21 corresponds to the eighth lens. A thin film having light absorption properties is formed on the object-side surface of the eighth lens, thereby obtaining the transmittance distribution. The second optical element 22 corresponds to a second lens. A thin film having light absorption properties is formed on the image-side surface of the second lens, thereby obtaining the transmittance distribution. The transmittance of each of the first optical element 21 and the second optical element 22 changes such that the transmittance monotonously decreases toward a peripheral area from the center.

The maximum image height of the optical system 2 is ±21.64 mm, and the difference in transmittance between areas through which the outermost off-axis rays pass in the entire system is 14.1%. According to the optical system 2, the difference in transmittance with respect to each maximum image height can be sufficiently reduced and the apodization effect with high rotational symmetry can be achieved as compared with the case where the first and second optical elements include the same transmittance distribution.

Figure 3:
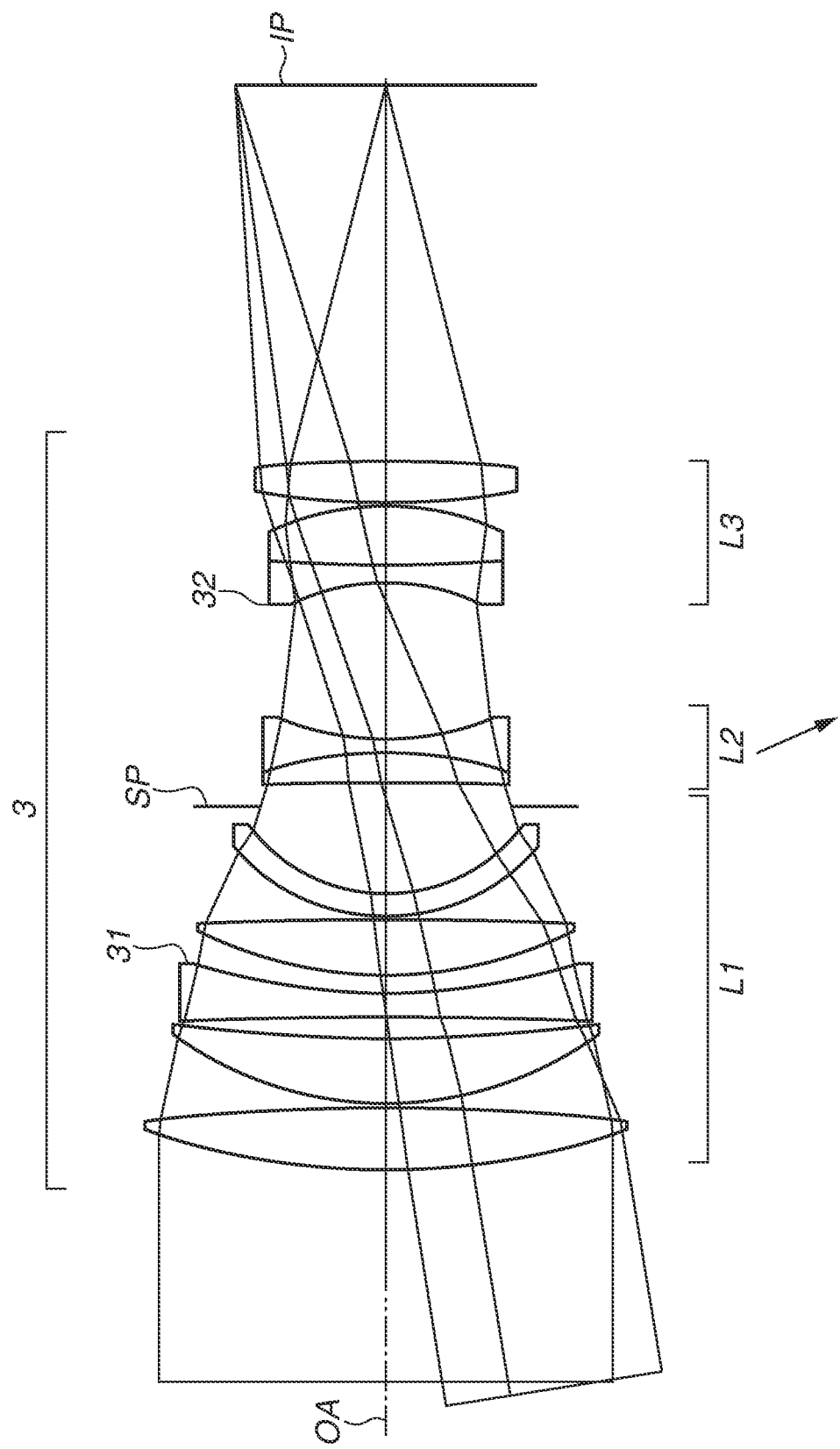
FIG. 3 is a sectional view of an optical system according to a third exemplary embodiment.

As illustrated in FIG. 3, an optical system 3 according to the third exemplary embodiment is composed of the first lens unit L1, which includes the aperture stop SP and has a positive refractive power, the second lens unit L2 having a negative refractive power, and the third lens unit L3 having a positive refractive power. The first lens unit L1, the second lens unit L2, and the third lens unit L3 are disposed in order from the object side to the image side. The first lens unit L1 includes a first optical element 31, and the third lens unit L3 includes a second optical element 32.

The first optical element 31 corresponds to the third lens. A thin film having light absorption properties is formed on the image-side surface of the third lens, thereby obtaining the transmittance distribution. The second optical element 32 corresponds to the eighth lens. A thin film having light absorption properties is formed on the object-side surface of the eighth lens, thereby obtaining the transmittance distribution. The transmittance of each of the first optical element 31 and the second optical element 32 changes such that the transmittance monotonously decreases toward a peripheral area from the center.

The optical system 3 causes the second lens unit L2 to move as indicated by an arrow in FIG. 3, thereby enabling focusing from an infinite distance to a closest distance. During focusing, the first lens unit L1 and the third lens unit L3 are immovable.

The maximum image height of the optical system 3 is ±21.64 mm, and the difference in transmittance between areas through which the outermost off-axis rays pass in the entire system is 4.0%. According to the optical system 3, the difference in transmittance with respect to each maximum image height can be sufficiently reduced and the apodization effect with high rotational symmetry can be achieved as compared with the case where the first and second optical elements include the same transmittance distribution.

Figure 4:
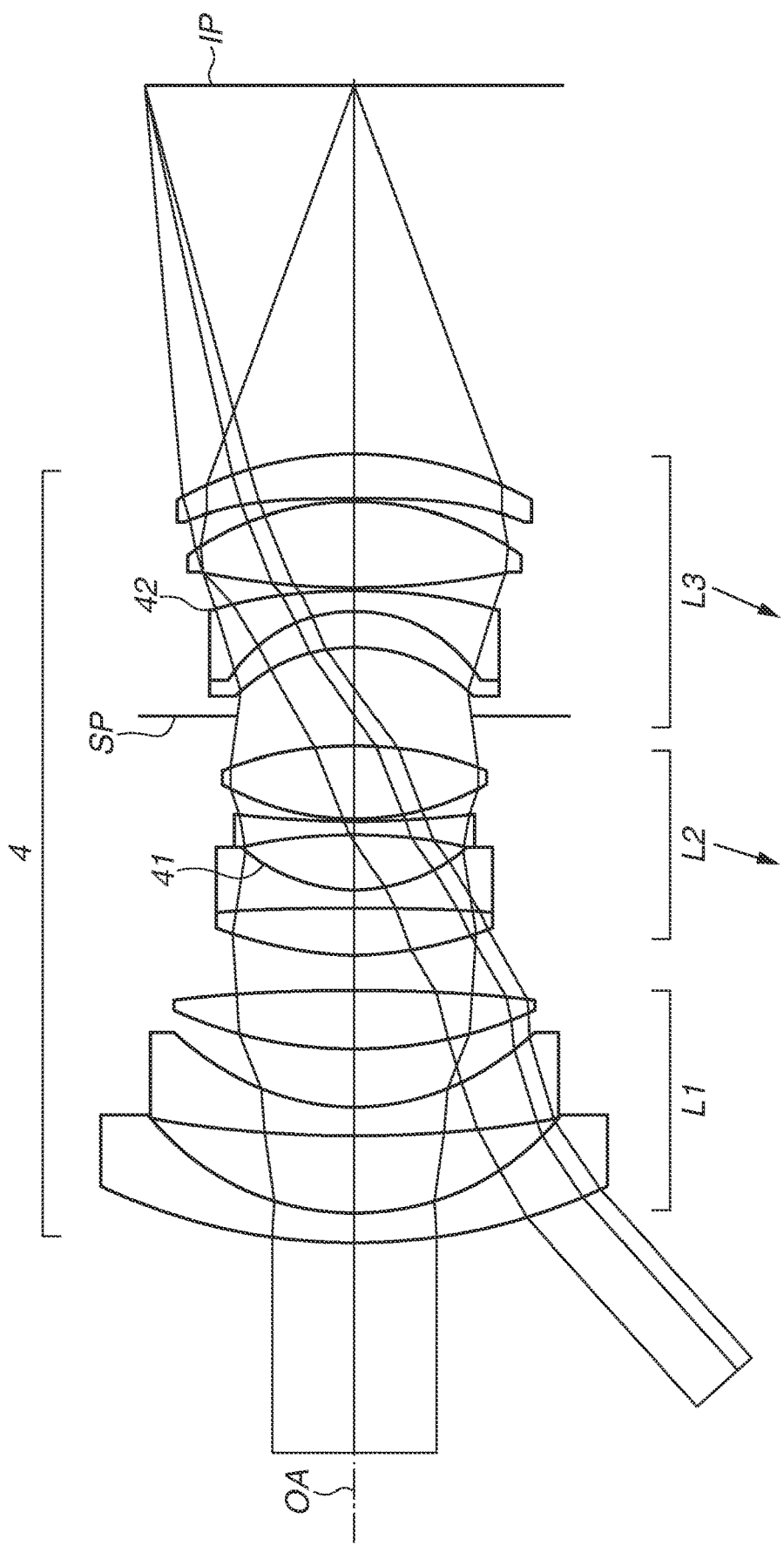
FIG. 4 is a sectional view of an optical system according to a fourth exemplary embodiment.

As illustrated in FIG. 4, an optical system 4 according to the fourth exemplary embodiment is composed of the first lens unit L1 having a negative refractive power, the second lens unit L2 having a positive refractive power, and the third lens unit L3, which includes the aperture stop SP and has a positive refractive power. The first lens unit L1, the second lens unit L2, and the third lens unit L3 are disposed in order from the object side to the image side. The second lens unit L2 includes a first optical element 41, and the third lens unit L3 includes a second optical element 42.

The first optical element 41 corresponds to a fifth lens. A thin film having light absorption properties is formed on the image-side surface of the fifth lens, thereby obtaining the transmittance distribution. The second optical element 42 corresponds to a ninth lens. A thin film having light absorption properties is formed on the image-side surface of the ninth lens, thereby obtaining the transmittance distribution. The transmittance of each of the first optical element 41 and the second optical element 42 changes such that the transmittance monotonously decreases toward a peripheral area from the center.

The optical system 4 causes the second lens unit L2 and the third lens unit L3 to move as indicated by arrows in FIG. 4, thereby enabling focusing from an infinite distance to a closest distance. During focusing, the interval between the second lens unit L2 and the third lens unit L3 varies. During focusing, the first lens unit L1 is immovable.

The maximum image height of the optical system 4 is ±21.64 mm, and the difference in transmittance between areas through which the outermost off-axis rays pass in the entire system is 0.2%. According to the optical system 4, the difference in transmittance with respect to each maximum image height can be sufficiently reduced and the apodization effect with high rotational symmetry can be achieved as compared with the case where the first and second optical elements include the same transmittance distribution.

Figure 5:
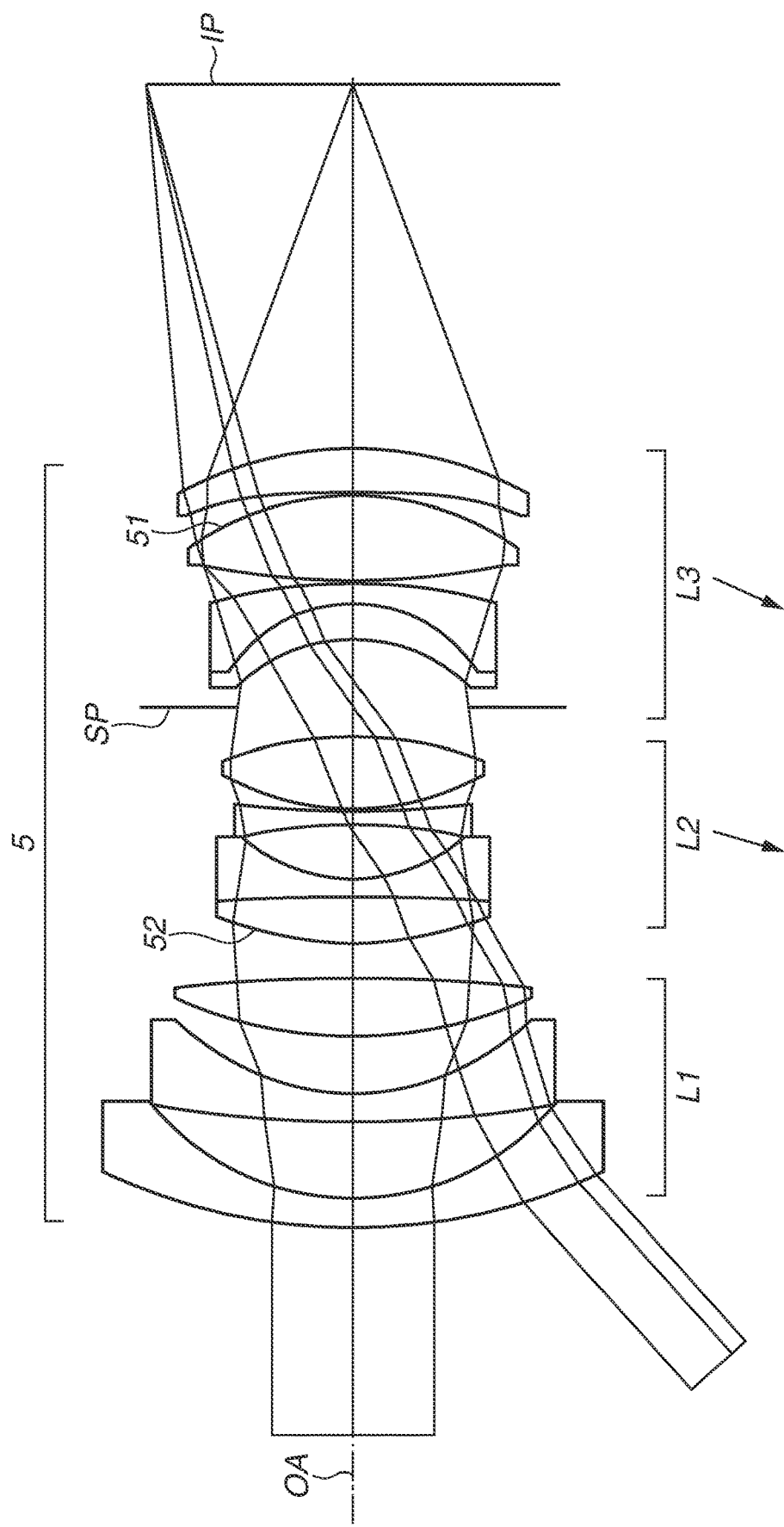
FIG. 5 is a sectional view of an optical system according to a fifth exemplary embodiment.

As illustrated in FIG. 5, an optical system 5 according to the fifth exemplary embodiment has a configuration similar to that of the optical system 4 according to the fourth exemplary embodiment, except for the positions of the first and second optical elements. In the optical system 5, the third lens unit L3 includes a first optical element 51, and the second lens unit L2 includes a second optical element 52.

The first optical element 51 corresponds to a tenth lens. A thin film having light absorption properties is formed on the image-side surface of the tenth lens, thereby obtaining the transmittance distribution. The second optical element 52 corresponds to a fourth lens. A thin film having light absorption properties is formed on the object-side surface of the fourth lens, thereby obtaining the transmittance distribution. The transmittance of each of the first optical element 51 and the second optical element 52 changes such that the transmittance monotonously decreases toward a peripheral area from the center.

The maximum image height of the optical system 5 is ±21.64 mm, and the difference in transmittance between areas through which the outermost off-axis rays pass in the entire system is 0.3%. According to the optical system 5, the difference in transmittance with respect to each maximum image height can be sufficiently reduced and the apodization effect with high rotational symmetry can be achieved as compared with the case where the first and second optical elements include the same transmittance distribution.

Figure 6:
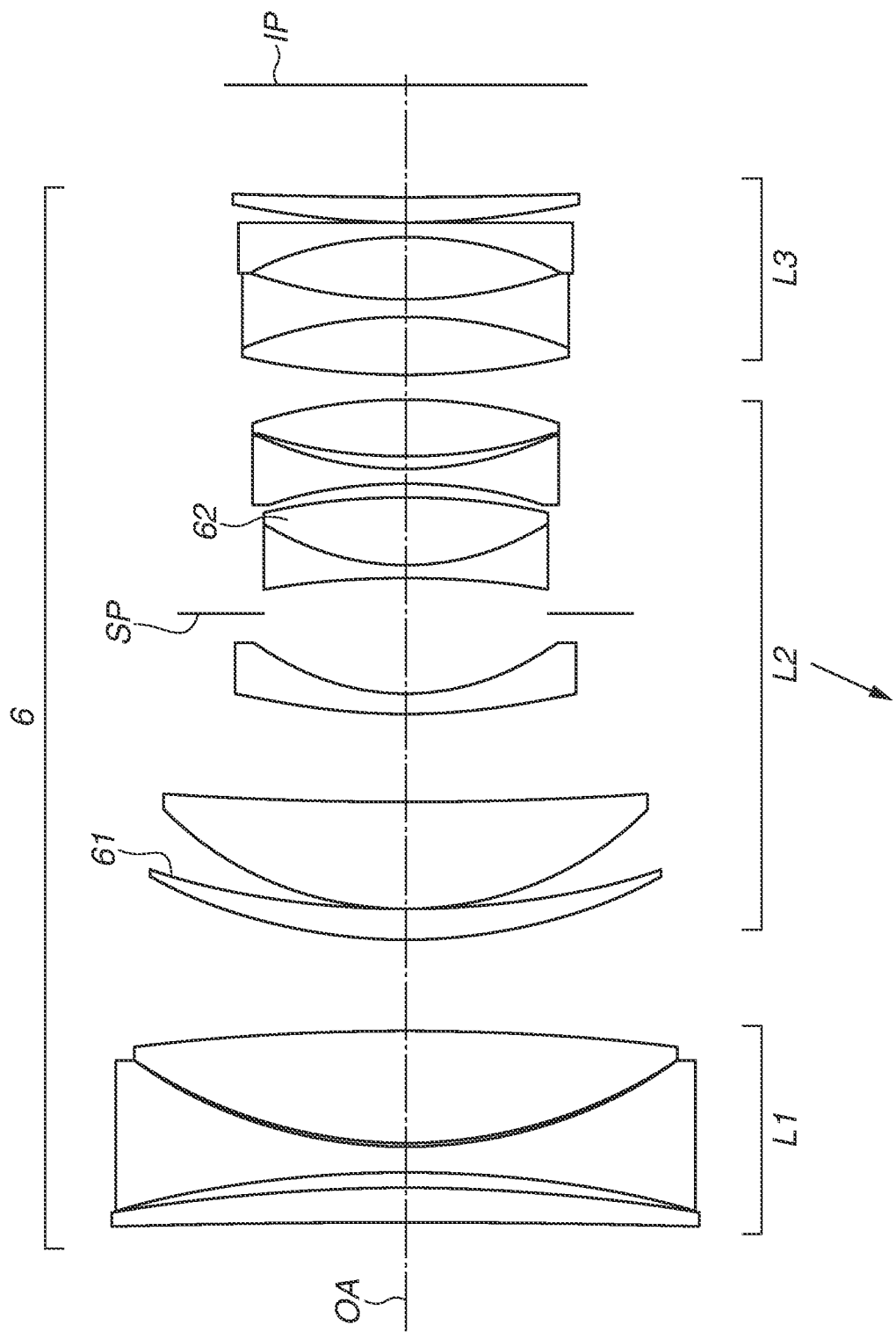
FIG. 6 is a sectional view of an optical system according to a sixth exemplary embodiment.

As illustrated in FIG. 6, an optical system 6 according to the sixth exemplary embodiment is composed of the first lens unit L1 having a positive refractive power, the second lens unit L2, which includes the aperture stop SP and has a positive refractive power, and the third lens unit L3 having a positive refractive power. The first lens unit L1, the second lens unit L2, and the third lens unit L3 are disposed in order from the object side to the image side. The second lens unit L2 includes a first optical element 61 and a second optical element 62.

The first optical element 61 corresponds to the fourth lens. A thin film having light absorption properties is formed on the image-side surface of the fourth lens, thereby obtaining the transmittance distribution. The second optical element 62 corresponds to the eighth lens. A thin film having light absorption properties is formed on the image-side surface of the eighth lens, thereby obtaining the transmittance distribution. The transmittance of each of the first optical element 61 and the second optical element 62 changes such that the transmittance monotonously decreases toward a peripheral area from the center.

The optical system 6 causes the second lens unit L2 to move as indicated by an arrow in FIG. 6, thereby enabling focusing from an infinite distance to a closest distance. During focusing, the first lens unit L1 and the third lens unit L3 are immovable.

The maximum image height of the optical system 6 is ±21.64 mm, and the difference in transmittance between areas through which the outermost off-axis rays pass in the entire system is 1.0%. According to the optical system 6, the difference in transmittance with respect to each maximum image height can be sufficiently reduced and the apodization effect with high rotational symmetry can be achieved as compared with the case where the first and second optical elements include the same transmittance distribution.

Figure 7:
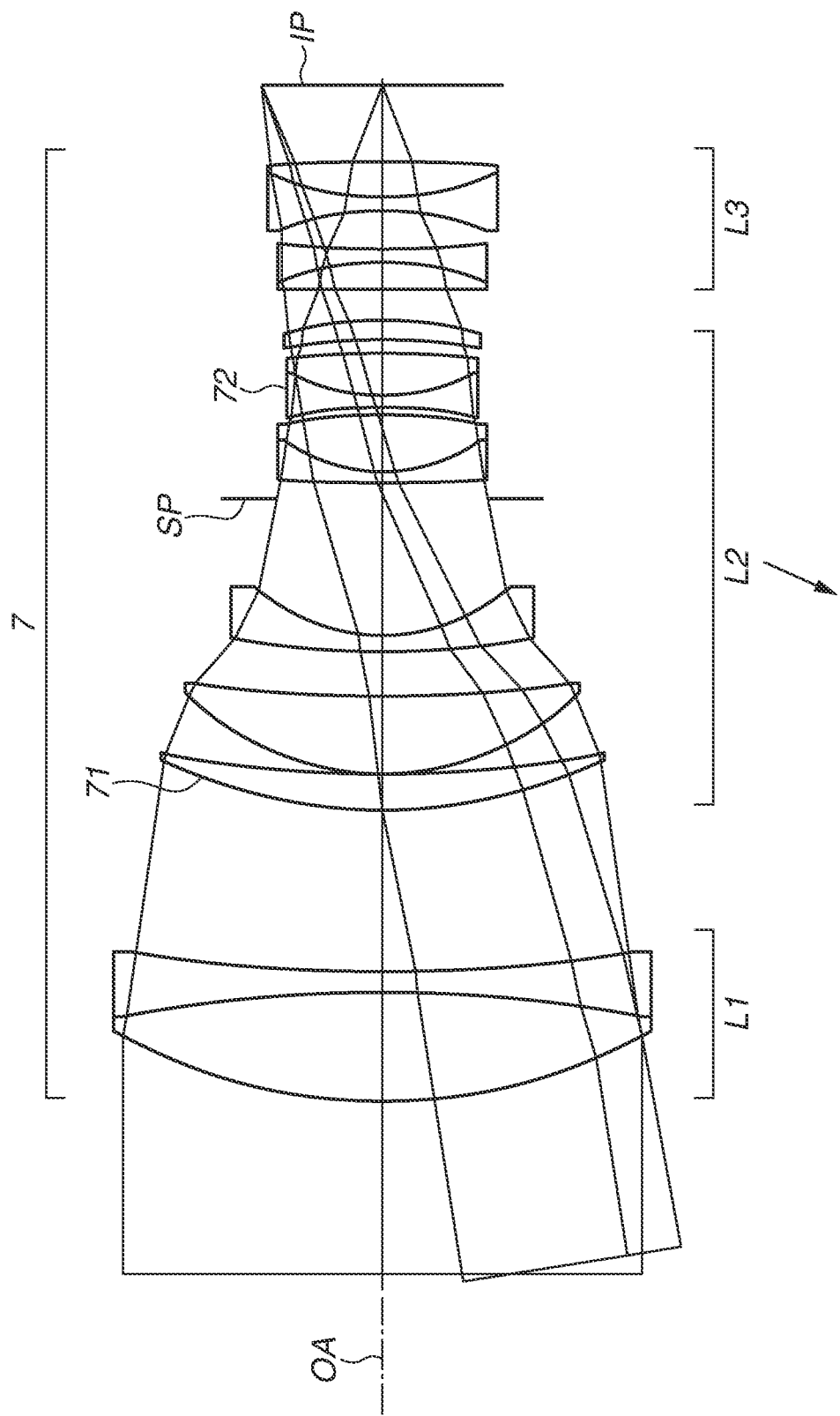
FIG. 7 is a sectional view of an optical system according to a seventh exemplary embodiment.

As illustrated in FIG. 7, an optical system 7 according to the seventh exemplary embodiment has a configuration similar to that of the optical system 1 according to the first exemplary embodiment, except for the positions of the first and second optical elements. In the optical system 7, the second lens unit L2 includes a first optical element 71 and a second optical element 72.

The first optical element 71 corresponds to the third lens. A thin film having light absorption properties is formed on the object-side surface of the third lens, thereby obtaining the transmittance distribution. The second optical element 72 corresponds to the eighth lens. A thin film having light absorption properties is formed on the image-side surface of the eighth lens that is joined to the ninth lens, thereby obtaining the transmittance distribution. The transmittance of each of the first optical element 71 and the second optical element 72 changes such that the transmittance monotonously decreases toward a peripheral area from the center.

The maximum image height of the optical system 7 is ±21.64 mm, and the difference in transmittance between areas through which the outermost off-axis rays pass in the entire system is 2.0%. According to the optical system 7, the difference in transmittance with respect to each maximum image height can be sufficiently reduced and the apodization effect with high rotational symmetry can be achieved as compared with the case where the first and second optical elements include the same transmittance distribution.

Figure 8:
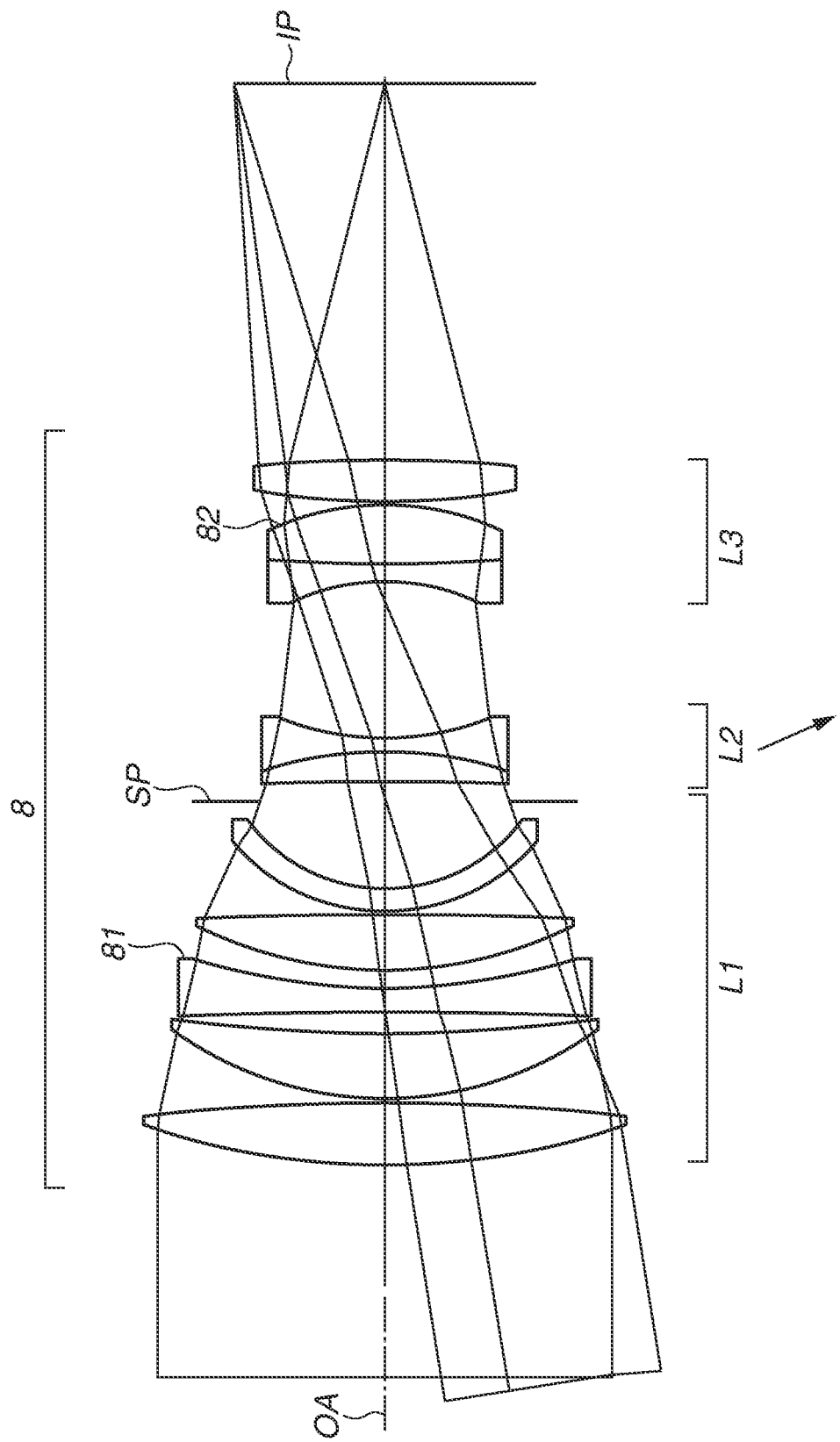
FIG. 8 is a sectional view of an optical system according to an eighth exemplary embodiment.

As illustrated in FIG. 8, an optical system 8 according to the eighth exemplary embodiment has a configuration similar to that of the optical system 3 according to the third exemplary embodiment, except for the positions of the first and second optical elements. In the optical system 8, the first lens unit L1 includes a first optical element 81, and the third lens unit L3 includes a second optical element 82.

The first optical element 81 corresponds to the third lens. A thin film having light absorption properties is formed on the image-side surface of the third lens, thereby obtaining the transmittance distribution. The second optical element 82 corresponds to the ninth lens. A thin film having light absorption properties is formed on the image-side surface of the ninth lens, thereby obtaining the transmittance distribution. The transmittance of each of the first optical element 81 and the second optical element 82 changes such that the transmittance monotonously decreases toward a peripheral area from the center.

The maximum image height of the optical system 8 is ±21.64 mm, and the difference in transmittance between areas through which the outermost off-axis rays pass in the entire system is 4.0%. According to the optical system 8, the difference in transmittance with respect to each maximum image height can be sufficiently reduced and the apodization effect with high rotational symmetry can be achieved as compared with the case where the first and second optical elements include the same transmittance distribution.

[Numerical Embodiments]

Next, first to eighth numerical embodiments corresponding to the above-described first to eighth exemplary embodiments, respectively, will be described below. In each numerical embodiment, when "m" represents the number of a surface counted from the object side, "r" represents the radius of curvature of an m-th surface, "d" represents an on-axis interval (distance on an optical axis) between the m-th surface and an (m+1)-th surface, "nd" represents a refractive index with respect to a d-line of a medium between the m-th surface and the (m+1)-th surface, and "vd" represents an Abbe number for the d-line of the medium.

When refractive indices with respect to an F-line (486.1 nm), a d-line (587.6 nm), and a C-line (656.3 nm), which are Fraunhofer lines, are represented by nF, nd, and nC, respectively, the Abbe number vd represents the value defined by the following expression.

$$vd = (nd-1)/(nF-nC)$$

In each numerical embodiment, an asterisk (*) is added to the end of each surface number for an optical surface having an aspherical surface shape. In addition, "e±P" for each aspherical surface coefficient indicates "×10$^{±P}$". When the amount of displacement from a surface vertex in an optical axis direction is represented by "x", a height from the optical axis in the direction perpendicular to the optical axis direction is represented by "h", a paraxial radius of curvature is represented by "r", a conic constant is represented by "k", and aspherical surface coefficients are represented by B, C, D, and E, the aspherical surface shape of the optical surface is expressed by the following Expression:

$$x = \frac{h^2/r}{1 + \sqrt{1-(1+k)(h/r)^2}} + Bh^4 + Ch^6 + Dh^8 + Eh^{10}$$

(First Numerical Embodiment)
Unit mm

Surface data

| Surface number | r | d | nd | vd | Effective diameter |
|---|---|---|---|---|---|
| 1 | 96.747 | 19.45 | 1.59282 | 68.6 | 92.64 |
| 2 | −266.533 | 3.80 | 1.80610 | 33.3 | 91.19 |
| 3 | 279.509 | (variable) | | | 87.82 |
| 4 | 89.897 | 6.34 | 1.89286 | 20.4 | 78.00 |
| 5 | 198.679 | 0.15 | | | 77.27 |
| 6 | 49.365 | 13.93 | 1.49700 | 81.5 | 69.10 |
| 7 | 233.752 | 7.96 | | | 66.62 |
| 8* | 132.469 | 3.00 | 1.85478 | 24.8 | 52.99 |
| 9 | 34.502 | 24.74 | | | 44.60 |
| 10 (stop) | ∞ | 2.60 | | | 37.65 |
| 11 | 374.702 | 2.00 | 1.72825 | 28.5 | 36.37 |
| 12 | 30.787 | 10.05 | 1.72916 | 54.7 | 34.45 |
| 13 | −103.672 | 1.51 | | | 33.48 |
| 14 | −74.493 | 2.00 | 1.72047 | 34.7 | 32.64 |
| 15 | 34.769 | 7.66 | 1.76182 | 26.5 | 30.95 |
| 16 | −154.919 | 2.43 | | | 31.95 |
| 17 | −95.585 | 3.50 | 1.80810 | 22.8 | 32.68 |
| 18 | −63.407 | (variable) | | | 33.66 |
| 19 | −623.111 | 4.93 | 1.88300 | 40.8 | 35.40 |
| 20 | −50.035 | 2.30 | 1.48749 | 70.2 | 35.68 |
| 21 | 164.745 | 6.85 | | | 35.62 |
| 22 | −50.699 | 2.50 | 1.72825 | 28.5 | 35.85 |
| 23 | 49.073 | 6.43 | 2.00100 | 29.1 | 39.48 |
| 24 | −315.413 | (variable) | | | 39.78 |
| Image plane | ∞ | | | | |

Aspherical surface data
Eighth surface

K = 0.00000e+000 B = −7.47245e−007 C = 1.06923e−010 D = −2.85764e−015

Various data

| | |
|---|---|
| Focal length | 131.00 |
| F-number | 1.41 |
| Angle of view | 9.38 |
| Image height | 21.64 |
| Lens entire length | 182.28 |
| BF | 13.87 |
| d3 | 28.90 |
| d18 | 5.39 |
| d24 | 13.87 |
| Incident pupil position | 229.03 |
| Exit pupil position | −43.24 |
| Front principal point position | 59.55 |
| Rear principal point position | −117.13 |

Unit data

| Unit | Start surface | Focal length | Lens structure length | Front principal point position | Rear principal point position |
|---|---|---|---|---|---|
| 1 | 1 | 363.42 | 23.25 | −18.57 | −31.31 |
| 2 | 4 | 137.20 | 87.86 | 50.90 | −53.87 |
| 3 | 19 | −587.65 | 23.01 | 16.18 | 0.13 |

Single lens element data

| Lens | Start surface | Focal length |
|---|---|---|
| 1 | 1 | 122.17 |
| 2 | 2 | −168.73 |
| 3 | 4 | 178.97 |
| 4 | 6 | 122.84 |
| 5 | 8 | −55.36 |
| 6 | 11 | −46.17 |
| 7 | 12 | 33.61 |
| 8 | 14 | −32.65 |
| 9 | 15 | 37.94 |
| 10 | 17 | 222.28 |
| 11 | 19 | 61.36 |

-continued (First Numerical Embodiment)
Unit mm

| | | |
|---|---|---|
| 12 | 20 | −78.45 |
| 13 | 22 | −33.88 |
| 14 | 23 | 42.80 |

(Second Numerical Embodiment)
Unit mm

Surface data

| Surface number | r | d | nd | vd | Effective diameter |
|---|---|---|---|---|---|
| 1 | 96.747 | 19.45 | 1.59282 | 68.6 | 92.64 |
| 2 | −266.533 | 3.80 | 1.80610 | 33.3 | 91.19 |
| 3 | 279.509 | (variable) | | | 87.82 |
| 4 | 89.897 | 6.34 | 1.89286 | 20.4 | 78.00 |
| 5 | 198.679 | 0.15 | | | 77.27 |
| 6 | 49.365 | 13.93 | 1.49700 | 81.5 | 69.10 |
| 7 | 233.752 | 7.96 | | | 66.62 |
| 8* | 132.469 | 3.00 | 1.85478 | 24.8 | 52.99 |
| 9 | 34.502 | 24.74 | | | 44.60 |
| 10 (stop) | ∞ | 2.60 | | | 37.65 |
| 11 | 374.702 | 2.00 | 1.72825 | 28.5 | 36.37 |
| 12 | 30.787 | 10.05 | 1.72916 | 54.7 | 34.45 |
| 13 | −103.672 | 1.51 | | | 33.48 |
| 14 | −74.493 | 2.00 | 1.72047 | 34.7 | 32.64 |
| 15 | 34.769 | 7.66 | 1.76182 | 26.5 | 30.95 |
| 16 | −154.919 | 2.43 | | | 31.95 |
| 17 | −95.585 | 3.50 | 1.80810 | 22.8 | 32.68 |
| 18 | −63.407 | (variable) | | | 33.66 |
| 19 | −623.111 | 4.93 | 1.88300 | 40.8 | 35.40 |
| 20 | −50.035 | 2.30 | 1.48749 | 70.2 | 35.68 |
| 21 | 164.745 | 6.85 | | | 35.62 |
| 22 | −50.699 | 2.50 | 1.72825 | 28.5 | 35.85 |
| 23 | 49.073 | 6.43 | 2.00100 | 29.1 | 39.48 |
| 24 | −315.413 | (variable) | | | 39.78 |
| Image plane | ∞ | | | | |

Aspherical surface data
Eighth surface

K = 0.00000e+000 B = −7.47245e−007 C = 1.06923e−010 D = −2.85764e−015

Various data

| | |
|---|---|
| Focal length | 131.00 |
| F-number | 1.41 |
| Angle of view | 9.38 |
| Image height | 21.64 |
| Lens entire length | 182.28 |
| BF | 13.87 |
| d3 | 28.90 |
| d18 | 5.39 |
| d24 | 13.87 |
| Incident pupil position | 229.03 |
| Exit pupil position | −43.24 |
| Front principal point position | 59.55 |
| Rear principal point position | −117.13 |

Unit data

| Unit | Start surface | Focal length | Lens structure length | Front principal point position | Rear principal point position |
|---|---|---|---|---|---|
| 1 | 1 | 363.42 | 23.25 | −18.57 | −31.31 |
| 2 | 4 | 137.20 | 87.86 | 50.90 | −53.87 |
| 3 | 19 | −587.65 | 23.01 | 16.18 | 0.13 |

-continued (Second Numerical Embodiment)
Unit mm

Single lens element data

| Lens | Start surface | Focal length |
|---|---|---|
| 1 | 1 | 122.17 |
| 2 | 2 | −168.73 |
| 3 | 4 | 178.97 |
| 4 | 6 | 122.84 |
| 5 | 8 | −55.36 |
| 6 | 11 | −46.17 |
| 7 | 12 | 33.61 |
| 8 | 14 | −32.65 |
| 9 | 15 | 37.94 |
| 10 | 17 | 222.28 |
| 11 | 19 | 61.36 |
| 12 | 20 | −78.45 |
| 13 | 22 | −33.88 |
| 14 | 23 | 42.80 |

(Third Numerical Embodiment)
Unit mm

Surface data

| Surface number | r | d | nd | vd | Effective diameter |
|---|---|---|---|---|---|
| 1 | 106.149 | 9.00 | 1.48749 | 70.2 | 67.59 |
| 2 | −290.997 | 0.50 | | | 66.92 |
| 3 | 51.244 | 9.50 | 1.49700 | 81.5 | 59.33 |
| 4 | 231.499 | 3.00 | | | 57.97 |
| 5 | −630.036 | 3.50 | 1.83400 | 37.2 | 57.44 |
| 6 | 93.250 | 2.50 | | | 53.74 |
| 7 | 60.005 | 8.00 | 1.49700 | 81.5 | 52.21 |
| 8 | −624.746 | 0.50 | | | 51.40 |
| 9 | 29.265 | 3.20 | 1.71736 | 29.5 | 42.32 |
| 10 | 24.308 | 12.50 | | | 37.96 |
| 11 (stop) | ∞ | (variable) | | | 35.51 |
| 12 | −2278.322 | 4.50 | 1.84666 | 23.9 | 33.90 |
| 13 | −55.787 | 2.00 | 1.71999 | 50.2 | 33.15 |
| 14 | 41.821 | (variable) | | | 29.87 |
| 15 | −30.566 | 2.50 | 1.74077 | 27.8 | 25.94 |
| 16 | 196.247 | 8.50 | 1.77250 | 49.6 | 28.92 |
| 17 | −39.608 | 0.50 | | | 32.22 |
| 18 | 106.631 | 6.00 | 1.83400 | 37.2 | 35.49 |
| 19 | −195.173 | (variable) | | | 36.07 |
| Image plane | ∞ | | | | |

Various data

| | |
|---|---|
| Focal length | 133.50 |
| F-number | 2.06 |
| Angle of view | 9.21 |
| Image height | 21.64 |
| Lens entire length | 155.12 |
| BF | 54.12 |
| d11 | 2.28 |

-continued (Third Numerical Embodiment)
Unit mm

| | |
|---|---|
| d14 | 22.52 |
| d19 | 54.12 |
| Incident pupil position | 74.83 |
| Exit pupil position | −91.49 |
| Front principal point position | 85.94 |
| Rear principal point position | −79.38 |

Unit data

| Unit | Start surface | Focal length | Lens structure length | Front principal point position | Rear principal point position |
|---|---|---|---|---|---|
| 1 | 1 | 93.89 | 52.20 | −8.11 | −44.04 |
| 2 | 12 | −65.39 | 6.50 | 3.68 | 0.09 |
| 3 | 15 | 82.08 | 17.50 | 17.56 | 10.42 |

Single lens element data

| Lens | Start surface | Focal length |
|---|---|---|
| 1 | 1 | 160.74 |
| 2 | 3 | 130.14 |
| 3 | 5 | −97.18 |
| 4 | 7 | 110.58 |
| 5 | 9 | −273.90 |
| 6 | 12 | 67.48 |
| 7 | 13 | −32.92 |
| 8 | 15 | −35.53 |
| 9 | 16 | 43.34 |
| 10 | 18 | 83.44 |

(Fourth Numerical Embodiment)
Unit mm

Surface data

| Surface number | r | d | nd | vd | Effective diameter |
|---|---|---|---|---|---|
| 1 | 60.645 | 2.99 | 1.83481 | 42.7 | 50.29 |
| 2 | 27.012 | 8.00 | | | 40.97 |
| 3 | 117.341 | 3.00 | 1.58313 | 59.4 | 40.70 |
| 4* | 23.272 | 5.95 | | | 35.84 |

-continued (Fourth Numerical Embodiment)
Unit mm

| | | | | | |
|---|---|---|---|---|---|
| 5 | 45.007 | 5.97 | 1.88300 | 40.8 | 35.69 |
| 6 | −181.809 | (variable) | | | 35.07 |
| 7 | 37.305 | 4.80 | 1.83481 | 42.7 | 27.16 |
| 8 | −220.690 | 1.90 | 1.49700 | 81.5 | 25.35 |
| 9 | 18.219 | 5.66 | | | 22.44 |
| 10 | −50.884 | 1.40 | 1.65412 | 39.7 | 22.57 |
| 11 | 108.422 | 0.15 | | | 23.67 |
| 12 | 27.172 | 7.64 | 1.49700 | 81.5 | 25.70 |
| 13 | −35.855 | (variable) | | | 25.82 |
| 14 (stop) | ∞ | 7.09 | | | 24.20 |
| 15 | −17.372 | 3.73 | 1.80400 | 46.6 | 23.44 |
| 16 | −15.383 | 2.15 | 1.80518 | 25.4 | 24.69 |
| 17 | −54.381 | 0.25 | | | 28.62 |
| 18 | 77.012 | 8.89 | 1.59240 | 68.3 | 31.17 |
| 19 | −29.139 | 0.25 | | | 32.76 |
| 20* | −146.547 | 4.60 | 1.80400 | 46.6 | 33.91 |
| 21 | −37.218 | (variable) | | | 35.21 |
| Image plane | ∞ | | | | |

Aspherical surface data

Fourth surface

K = 0.00000e+0 B = −7.07218e−006 C = −1.52849e−008 D = 1.49643e−011
E = −7.71857e−014

Twentieth surface

K = 0.00000e+000 B = −1.18658e−005 C = −2.84003e−009 D = −1.17097e−011
E = −7.45942e−015

Various data

| | |
|---|---|
| Focal length | 24.55 |
| F-number | 1.45 |
| Angle of view | 41.39 |
| Image height | 21.64 |
| Lens entire length | 119.13 |
| BF | 38.01 |
| d6 | 3.69 |
| d13 | 3.00 |
| d21 | 38.01 |
| Incident pupil position | 27.73 |
| Exit pupil position | −52.69 |
| Front principal point position | 45.64 |
| Rear principal point position | 13.46 |

Unit data

| Unit | Start surface | Focal length | Lens structure length | Front principal point position | Rear principal point position |
|---|---|---|---|---|---|
| 1 | 1 | −176.09 | 25.92 | −34.51 | −70.99 |
| 2 | 7 | 86.22 | 21.55 | 12.33 | −5.36 |
| 3 | 14 | 38.45 | 26.96 | 23.91 | 10.56 |

Single lens element data

| Lens | Start surface | Focal length |
|---|---|---|
| 1 | 1 | −60.81 |
| 2 | 3 | −50.37 |
| 3 | 5 | 41.37 |
| 4 | 7 | 38.55 |
| 5 | 8 | −33.77 |
| 6 | 10 | −52.76 |
| 7 | 12 | 32.41 |
| 8 | 15 | 91.08 |
| 9 | 16 | −27.31 |
| 10 | 18 | 36.83 |
| 11 | 20 | 60.91 |

(Fifth Numerical Embodiment)
Unit mm

Surface data

| Surface number | r | d | nd | vd | Effective diameter |
|---|---|---|---|---|---|
| 1 | 60.645 | 2.99 | 1.83481 | 42.7 | 50.29 |
| 2 | 27.012 | 8.00 | | | 40.97 |
| 3 | 117.341 | 3.00 | 1.58313 | 59.4 | 40.70 |
| 4* | 23.272 | 5.95 | | | 35.84 |
| 5 | 45.007 | 5.97 | 1.88300 | 40.8 | 35.69 |
| 6 | −181.809 | (variable) | | | 35.07 |
| 7 | 37.305 | 4.80 | 1.83481 | 42.7 | 27.16 |
| 8 | −220.690 | 1.90 | 1.49700 | 81.5 | 25.35 |
| 9 | 18.219 | 5.66 | | | 22.44 |
| 10 | −50.884 | 1.40 | 1.65412 | 39.7 | 22.57 |
| 11 | 108.422 | 0.15 | | | 23.67 |
| 12 | 27.172 | 7.64 | 1.49700 | 81.5 | 25.70 |
| 13 | −35.855 | (variable) | | | 25.82 |
| 14 (stop) | ∞ | 7.09 | | | 24.20 |
| 15 | −17.372 | 3.73 | 1.80400 | 46.6 | 23.44 |
| 16 | −15.383 | 2.15 | 1.80518 | 25.4 | 24.69 |
| 17 | −54.381 | 0.25 | | | 28.62 |
| 18 | 77.012 | 8.89 | 1.59240 | 68.3 | 31.17 |
| 19 | −29.139 | 0.25 | | | 32.76 |
| 20* | −146.547 | 4.60 | 1.80400 | 46.6 | 33.91 |
| 21 | −37.218 | (variable) | | | 35.21 |
| Image plane | ∞ | | | | |

Aspherical surface data

Fourth surface $K = 0.00000e+000$ $B = -7.07218e-006$ $C = -1.52849e-008$ $D = 1.49643e-011$
$E = -7.71857e-014$ Twentieth surface $K = 0.00000e+000$ $B = -1.18658e-005$ $C = -2.84003e-009$ $D = -1.17097e-011$
$E = -7.45942e-015$ Various data

| Focal length | 24.55 |
|---|---|
| F-number | 1.45 |
| Angle of view | 41.39 |
| Image height | 21.64 |
| Lens entire length | 119.13 |
| BF | 38.01 |
| d6 | 3.69 |
| d13 | 3.00 |
| d21 | 38.01 |
| Incident pupil position | 27.73 |
| Exit pupil position | −52.69 |
| Front principal point position | 45.64 |
| Rear principal point position | 13.46 |

Unit data

| Unit | Start surface | Focal length | Lens structure length | Front principal point position | Rear principal point position |
|---|---|---|---|---|---|
| 1 | 1 | −176.09 | 25.92 | −34.51 | −70.99 |
| 2 | 7 | 86.22 | 21.55 | 12.33 | −5.36 |
| 3 | 14 | 38.45 | 26.96 | 23.91 | 10.56 |

Single lens element data

| Lens | Start surface | Focal length |
|---|---|---|
| 1 | 1 | −60.81 |
| 2 | 3 | −50.37 |
| 3 | 5 | 41.37 |
| 4 | 7 | 38.55 |
| 5 | 8 | −33.77 |
| 6 | 10 | −52.76 |
| 7 | 12 | 32.41 |
| 8 | 15 | 91.08 |

-continued

| (Fifth Numerical Embodiment) Unit mm | | |
|---|---|---|
| 9 | 16 | −27.31 |
| 10 | 18 | 36.83 |
| 11 | 20 | 60.91 |

(Sixth Numerical Embodiment)
Unit mm

Surface data

| Surface number | r | d | nd | vd | Effective diameter |
|---|---|---|---|---|---|
| 1 | −1138.145 | 4.00 | 1.49700 | 81.5 | 68.00 |
| 2 | −214.828 | 2.02 | | | 67.31 |
| 3 | −127.510 | 3.00 | 1.54814 | 45.8 | 67.18 |
| 4 | 55.168 | 0.36 | | | 62.76 |
| 5 | 56.148 | 13.46 | 1.59349 | 67.0 | 62.82 |
| 6 | −272.562 | (variable) | | | 62.26 |
| 7 | 65.476 | 3.61 | 1.89286 | 20.4 | 59.02 |
| 8* | 101.465 | 0.15 | | | 58.60 |
| 9 | 40.646 | 12.72 | 1.49700 | 81.5 | 56.02 |
| 10 | 425.820 | 10.53 | | | 54.07 |
| 11* | 67.059 | 2.50 | 1.85478 | 24.8 | 39.10 |
| 12 | 29.596 | 9.56 | | | 34.55 |
| 13 (stop) | ∞ | 4.31 | | | 33.30 |
| 14 | −99.074 | 1.50 | 1.69895 | 30.1 | 32.37 |
| 15 | 30.811 | 8.02 | 1.80400 | 46.6 | 32.06 |
| 16 | −79.612 | 1.80 | | | 31.85 |
| 17 | −51.867 | 1.70 | 1.71736 | 29.5 | 31.30 |
| 18 | 40.919 | 1.50 | 1.60401 | 20.8 | 33.72 |
| 19 | 59.136 | 6.79 | 1.95375 | 32.3 | 34.00 |
| 20 | −59.136 | (variable) | | | 34.80 |
| 21 | 95.420 | 6.88 | 1.88300 | 40.8 | 37.39 |
| 22 | −51.595 | 2.20 | 1.56732 | 42.8 | 37.38 |
| 23 | 58.097 | 7.40 | | | 35.92 |
| 24 | −42.217 | 1.65 | 1.58144 | 40.8 | 35.97 |
| 25 | −2529.799 | 0.15 | | | 38.21 |
| 26 | 105.125 | 3.00 | 2.00100 | 29.1 | 39.55 |
| 27 | 696.276 | (variable) | | | 39.70 |
| Image plane | ∞ | | | | |

Aspherical surface data
Eleventh surface

K = 0.00000e+000 B = −3.52523e−006 C = −1.76158e−009 D = 6.41509e−013

Various data

| | |
|---|---|
| Focal length | 71.50 |
| F-number | 1.24 |
| Angle of view | 16.84 |
| Image height | 21.64 |
| Lens entire length | 136.26 |
| BF | 13.49 |
| d6 | 10.95 |
| d20 | 3.02 |
| d27 | 13.49 |
| Incident pupil position | 87.71 |
| Exit pupil position | −36.75 |
| Front principal point position | 57.46 |
| Rear principal point position | −58.01 |

Unit data

| Unit | Start surface | Focal length | Lens structure length | Front principal point position | Rear principal point position |
|---|---|---|---|---|---|
| 1 | 1 | 2010.25 | 22.84 | 56.60 | 42.26 |
| 2 | 7 | 83.50 | 64.69 | 34.86 | −43.11 |
| 3 | 21 | 918.02 | 21.28 | −79.01 | −87.16 |

(Sixth Numerical Embodiment)
Unit mm

Single lens element data

| Lens | Start surface | Focal length |
|---|---|---|
| 1 | 1 | 532.06 |
| 2 | 3 | −69.85 |
| 3 | 5 | 79.66 |
| 4 | 7 | 197.42 |
| 5 | 9 | 89.43 |
| 6 | 11 | −63.94 |
| 7 | 14 | −33.47 |
| 8 | 15 | 28.55 |
| 9 | 17 | −31.64 |
| 10 | 18 | 213.30 |
| 11 | 19 | 31.90 |
| 12 | 21 | 38.78 |
| 13 | 22 | −47.82 |
| 14 | 24 | −73.86 |
| 15 | 26 | 123.38 |

(Seventh Numerical Embodiment)
Unit mm

Surface data

| Surface number | r | d | nd | vd | Effective diameter |
|---|---|---|---|---|---|
| 1 | 96.747 | 19.45 | 1.59282 | 68.6 | 92.64 |
| 2 | −266.533 | 3.80 | 1.80610 | 33.3 | 91.19 |
| 3 | 279.509 | (variable) | | | 87.82 |
| 4 | 89.897 | 6.34 | 1.89286 | 20.4 | 78.00 |
| 5 | 198.679 | 0.15 | | | 77.27 |
| 6 | 49.365 | 13.93 | 1.49700 | 81.5 | 69.10 |
| 7 | 233.752 | 7.96 | | | 66.62 |
| 8* | 132.469 | 3.00 | 1.85478 | 24.8 | 52.99 |
| 9 | 34.502 | 24.74 | | | 44.60 |
| 10 (stop) | ∞ | 2.60 | | | 37.65 |
| 11 | 374.702 | 2.00 | 1.72825 | 28.5 | 36.37 |
| 12 | 30.787 | 10.05 | 1.72916 | 54.7 | 34.45 |
| 13 | −103.672 | 1.51 | | | 33.48 |
| 14 | −74.493 | 2.00 | 1.72047 | 34.7 | 32.64 |
| 15 | 34.769 | 7.66 | 1.76182 | 26.5 | 30.95 |
| 16 | −154.919 | 2.43 | | | 31.95 |
| 17 | −95.585 | 3.50 | 1.80810 | 22.8 | 32.68 |
| 18 | −63.407 | (variable) | | | 33.66 |
| 19 | −623.111 | 4.93 | 1.88300 | 40.8 | 35.40 |
| 20 | −50.035 | 2.30 | 1.48749 | 70.2 | 35.68 |
| 21 | 164.745 | 6.85 | | | 35.62 |
| 22 | −50.699 | 2.50 | 1.72825 | 28.5 | 35.85 |
| 23 | 49.073 | 6.43 | 2.00100 | 29.1 | 39.48 |
| 24 | −315.413 | (variable) | | | 39.78 |
| Image plane | ∞ | | | | |

Aspherical surface data
Eighth surface

K = 0.00000e+000 B = −7.47245e−007 C = 1.06923e−010 D = −2.85764e−015

Various data

| Focal length | 131.00 |
|---|---|
| F-number | 1.41 |
| Angle of view | 9.38 |
| Image height | 21.64 |
| Lens entire length | 182.28 |
| BF | 13.87 |
| d3 | 28.90 |
| d18 | 5.39 |
| d24 | 13.87 |
| Incident pupil position | 229.03 |

(Seventh Numerical Embodiment)
Unit mm

| | |
|---|---|
| Exit pupil position | −43.24 |
| Front principal point position | 59.55 |
| Rear principal point position | −117.13 |

Unit data

| Unit | Start surface | Focal length | Lens structure length | Front principal point position | Rear principal point position |
|---|---|---|---|---|---|
| 1 | 1 | 363.42 | 23.25 | −18.57 | −31.31 |
| 2 | 4 | 137.20 | 87.86 | 50.90 | −53.87 |
| 3 | 19 | −587.65 | 23.01 | 16.18 | 0.13 |

Single lens element data

| Lens | Start surface | Focal length |
|---|---|---|
| 1 | 1 | 122.17 |
| 2 | 2 | −168.73 |
| 3 | 4 | 178.97 |
| 4 | 6 | 122.84 |
| 5 | 8 | −55.36 |
| 6 | 11 | −46.17 |
| 7 | 12 | 33.61 |
| 8 | 14 | −32.65 |
| 9 | 15 | 37.94 |
| 10 | 17 | 222.28 |
| 11 | 19 | 61.36 |
| 12 | 20 | −78.45 |
| 13 | 22 | −33.88 |
| 14 | 23 | 42.80 |

(Eighth Numerical Embodiment)
Unit mm

Surface data

| Surface number | r | d | nd | vd | Effective diameter |
|---|---|---|---|---|---|
| 1 | 106.149 | 9.00 | 1.48749 | 70.2 | 67.59 |
| 2 | −290.997 | 0.50 | | | 66.92 |
| 3 | 51.244 | 9.50 | 1.49700 | 81.5 | 59.33 |
| 4 | 231.499 | 3.00 | | | 57.97 |
| 5 | −630.036 | 3.50 | 1.83400 | 37.2 | 57.44 |
| 6 | 93.250 | 2.50 | | | 53.74 |
| 7 | 60.005 | 8.00 | 1.49700 | 81.5 | 52.21 |
| 8* | −624.746 | 0.50 | | | 51.40 |
| 9 | 29.265 | 3.20 | 1.71736 | 29.5 | 42.32 |
| 10 | 24.308 | 12.50 | | | 37.96 |
| 11 (stop) | ∞ | (variable) | | | 35.51 |
| 12 | −2278.322 | 4.50 | 1.84666 | 23.9 | 33.90 |
| 13 | −55.787 | 2.00 | 1.71999 | 50.2 | 33.15 |
| 14 | 41.821 | (variable) | | | 29.87 |
| 15 | −30.566 | 2.50 | 1.74077 | 27.8 | 25.94 |
| 16 | 196.247 | 8.50 | 1.77250 | 49.6 | 28.92 |
| 17 | −39.608 | 0.50 | | | 32.22 |
| 18 | 106.631 | 6.00 | 1.83400 | 37.2 | 35.49 |
| 19 | −195.173 | (variable) | | | 36.07 |
| Image plane | ∞ | | | | |

Various data

| | |
|---|---|
| Focal length | 133.50 |
| F-number | 2.06 |
| Angle of view | 9.21 |
| Image height | 21.64 |
| Lens entire length | 155.12 |
| BF | 54.12 |
| d11 | 2.28 |
| d14 | 22.52 |
| d19 | 54.12 |
| Incident pupil position | 74.83 |
| Exit pupil position | −91.49 |
| Front principal point position | 85.94 |
| Rear principal point position | −79.38 |

Unit data

| Unit | Start surface | Focal length | Lens structure length | Front principal point position | Rear principal point position |
|---|---|---|---|---|---|
| 1 | 1 | 93.89 | 52.20 | −8.11 | −44.04 |
| 2 | 12 | −65.39 | 6.50 | 3.68 | 0.09 |
| 3 | 15 | 82.08 | 17.50 | 17.56 | 10.42 |

Single lens element data

| Lens | Start surface | Focal length |
|---|---|---|
| 1 | 1 | 160.74 |
| 2 | 3 | 130.14 |
| 3 | 5 | −97.18 |
| 4 | 7 | 110.58 |
| 5 | 9 | −273.90 |
| 6 | 12 | 67.48 |
| 7 | 13 | −32.92 |
| 8 | 15 | −35.53 |
| 9 | 16 | 43.34 |
| 10 | 18 | 83.44 |

Table 1 illustrates various values in each of the first to eighth numerical embodiments.

TABLE 1

|  | First Embodiment | Second Embodiment | Third Embodiment | Fourth Embodiment | Fifth Embodiment | Sixth Embodiment | Seventh Embodiment | Eighth Embodiment |
|---|---|---|---|---|---|---|---|---|
| a1 | 39.000 | 16.320 | 26.868 | 11.219 | 15.857 | 29.298 | 39.000 | 26.868 |
| a2 | 16.320 | 43.912 | 12.968 | 14.310 | 12.557 | 15.926 | 15.473 | 14.421 |
| m1 | −32.847 | 14.251 | −24.816 | −9.479 | 16.382 | −25.184 | −32.847 | −24.816 |
| m2 | 14.251 | −42.604 | 12.359 | 12.447 | −13.577 | 14.237 | 15.473 | 16.111 |
| m1 × m2 | −468.105 | −607.160 | −306.705 | −117.987 | −222.424 | −358.544 | −508.235 | −399.795 |
| \|m1/a1\| | 0.842 | 0.873 | 0.924 | 0.845 | 1.033 | 0.860 | 0.842 | 0.924 |
| \|m2/a2\| | 0.873 | 0.970 | 0.953 | 0.870 | 1.081 | 0.894 | 1.000 | 1.117 |
| $T1(\varphi1/2)/T2(\varphi2/2)$ | 1.000 | 0.862 | 0.820 | 1.005 | 0.862 | 1.000 | 0.041 | 0.313 |
| (\|m1/a1\| − 1) × (\|m2/a2\| − 1) | 0.020 | 0.004 | 0.004 | 0.020 | 0.003 | 0.015 | 0.000 | −0.009 |
| \|m1/a1\|/\|m2/a2\| | 0.965 | 0.900 | 0.969 | 0.971 | 0.955 | 0.962 | 0.842 | 0.827 |
| Da | 37.648 | 37.648 | 35.506 | 24.201 | 24.201 | 33.300 | 37.648 | 35.506 |
| Dm | 15.581 | 15.581 | 16.525 | 8.046 | 8.046 | 13.244 | 15.581 | 16.525 |
| Dm/Da | 0.414 | 0.414 | 0.465 | 0.332 | 0.332 | 0.398 | 0.414 | 0.465 |
| DA1 | 78.000 | 32.641 | 53.737 | 22.439 | 25.114 | 58.595 | 78.000 | 53.737 |
| DA2 | 32.641 | 87.824 | 25.937 | 28.620 | 31.713 | 31.851 | 30.946 | 28.842 |
| DM1 | 32.955 | 12.908 | 25.093 | 6.420 | 7.850 | 24.122 | 32.955 | 25.093 |
| DM2 | 12.908 | 37.006 | 11.159 | 6.845 | 7.233 | 11.729 | 13.556 | 12.228 |
| DM1/DA1 | 0.423 | 0.395 | 0.467 | 0.286 | 0.313 | 0.412 | 0.423 | 0.467 |
| DM2/DA2 | 0.395 | 0.421 | 0.430 | 0.239 | 0.228 | 0.368 | 0.438 | 0.424 |
| T1(r11) − T1(r12) | 0.291 | 0.336 | 0.373 | 0.369 | 0.379 | 0.282 | 0.280 | 0.276 |
| T2(r21) − T2(r22) | 0.327 | 0.406 | 0.381 | 0.385 | 0.385 | 0.344 | 0.258 | 0.274 |
| $\varphi1$ | 78.000 | 32.641 | 53.737 | 28.620 | 32.764 | 58.595 | 78.000 | 53.737 |
| $\varphi2$ | 32.641 | 87.824 | 25.937 | 22.439 | 27.155 | 31.851 | 30.946 | 32.221 |
| r1 | 19.500 | 8.160 | 13.434 | 7.155 | 8.191 | 14.649 | 19.500 | 13.434 |
| r2 | 8.160 | 21.956 | 6.484 | 5.610 | 6.789 | 7.963 | 7.737 | 8.055 |
| T1(r1) | 0.738 | 0.823 | 0.921 | 0.919 | 0.919 | 0.717 | 0.688 | 0.702 |
| T2(r2) | 0.806 | 0.951 | 0.946 | 0.952 | 0.939 | 0.832 | 0.828 | 0.757 |
| T1(r1)/T2(r2) | 0.916 | 0.866 | 0.973 | 0.966 | 0.978 | 0.862 | 0.832 | 0.927 |
| $2 \times r1/\varphi1$ | 0.500 | 0.500 | 0.500 | 0.500 | 0.500 | 0.500 | 0.500 | 0.500 |
| $2 \times r2/\varphi2$ | 0.500 | 0.500 | 0.500 | 0.500 | 0.500 | 0.500 | 0.500 | 0.500 |
| $T1(\varphi1/2)$ | 0.045 | 0.042 | 0.081 | 0.089 | 0.068 | 0.039 | 0.009 | 0.031 |
| $T2(\varphi2/2)$ | 0.045 | 0.048 | 0.099 | 0.088 | 0.079 | 0.039 | 0.222 | 0.100 |
| $T1(\varphi1/4)$ | 0.738 | 0.823 | 0.921 | 0.919 | 0.919 | 0.717 | 0.688 | 0.702 |
| $T2(\varphi2/4)$ | 0.806 | 0.951 | 0.946 | 0.952 | 0.939 | 0.832 | 0.828 | 0.757 |
| r11 | 27.300 | 11.424 | 18.808 | 10.017 | 11.467 | 20.508 | 27.300 | 18.808 |
| r12 | 35.100 | 14.688 | 24.182 | 12.879 | 14.744 | 26.368 | 35.100 | 24.182 |
| r21 | 11.424 | 30.738 | 9.078 | 7.854 | 9.504 | 11.148 | 10.831 | 11.277 |
| r22 | 14.688 | 39.521 | 11.672 | 10.098 | 12.220 | 14.333 | 13.926 | 14.499 |
| $2 \times r11/\varphi1$ | 0.700 | 0.700 | 0.700 | 0.700 | 0.700 | 0.700 | 0.700 | 0.700 |
| $2 \times r21/\varphi2$ | 0.700 | 0.700 | 0.700 | 0.700 | 0.700 | 0.700 | 0.700 | 0.700 |
| $2 \times r12/\varphi1$ | 0.900 | 0.900 | 0.900 | 0.900 | 0.900 | 0.900 | 0.900 | 0.900 |
| $2 \times r22/\varphi2$ | 0.900 | 0.900 | 0.900 | 0.900 | 0.900 | 0.900 | 0.900 | 0.900 |
| \|n1 − n2\| | 0.172 | 0.086 | 0.093 | 0.308 | 0.242 | 0.089 | 0.172 | 0.062 |

Table 2 illustrates transmittances at diameter positions from 0.0 to 1.0 when the effective diameter is normalized for the first and second optical elements in each of the first to eighth numerical embodiments.

TABLE 2

| Normalized diameter | | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|---|
| First Embodiment | 11 | 1.000 | 1.000 | 0.976 | 0.917 | 0.837 | 0.738 | 0.625 | 0.498 | 0.358 | 0.207 | 0.045 |
|  | 12 | 1.000 | 1.000 | 0.990 | 0.953 | 0.891 | 0.806 | 0.698 | 0.567 | 0.415 | 0.240 | 0.045 |
| Second Embodiment | 21 | 1.000 | 1.000 | 0.999 | 0.970 | 0.910 | 0.823 | 0.712 | 0.577 | 0.420 | 0.241 | 0.042 |
|  | 22 | 1.000 | 1.000 | 1.000 | 0.998 | 0.986 | 0.951 | 0.882 | 0.768 | 0.598 | 0.362 | 0.048 |
| Third Embodiment | 31 | 1.000 | 1.000 | 1.000 | 0.998 | 0.975 | 0.921 | 0.831 | 0.703 | 0.537 | 0.330 | 0.081 |
|  | 32 | 1.000 | 1.000 | 1.000 | 0.999 | 0.986 | 0.946 | 0.871 | 0.754 | 0.589 | 0.373 | 0.099 |
| Fourth Embodiment | 41 | 1.000 | 1.000 | 0.998 | 0.989 | 0.965 | 0.919 | 0.843 | 0.730 | 0.572 | 0.361 | 0.089 |
|  | 42 | 1.000 | 1.000 | 1.000 | 0.996 | 0.983 | 0.952 | 0.892 | 0.790 | 0.633 | 0.405 | 0.088 |
| Fifth Embodiment | 51 | 1.000 | 1.000 | 0.999 | 0.992 | 0.967 | 0.919 | 0.838 | 0.720 | 0.556 | 0.341 | 0.068 |
|  | 52 | 1.000 | 1.000 | 1.000 | 0.995 | 0.978 | 0.939 | 0.869 | 0.759 | 0.597 | 0.374 | 0.079 |
| Sixth Embodiment | 61 | 1.000 | 1.000 | 0.972 | 0.906 | 0.819 | 0.717 | 0.602 | 0.476 | 0.339 | 0.193 | 0.039 |
|  | 62 | 1.000 | 1.000 | 0.994 | 0.965 | 0.911 | 0.832 | 0.726 | 0.595 | 0.436 | 0.251 | 0.039 |
| Seventh Embodiment | 71 | 1.000 | 1.000 | 0.975 | 0.897 | 0.799 | 0.688 | 0.567 | 0.438 | 0.301 | 0.158 | 0.009 |
|  | 72 | 1.000 | 1.000 | 0.994 | 0.959 | 0.903 | 0.828 | 0.736 | 0.628 | 0.506 | 0.371 | 0.222 |
| Eighth Embodiment | 81 | 1.000 | 1.000 | 0.991 | 0.913 | 0.814 | 0.702 | 0.581 | 0.453 | 0.318 | 0.177 | 0.031 |
|  | 82 | 1.000 | 1.000 | 0.995 | 0.938 | 0.856 | 0.757 | 0.646 | 0.523 | 0.390 | 0.249 | 0.100 |

[Optical Apparatus]

Figure 9:
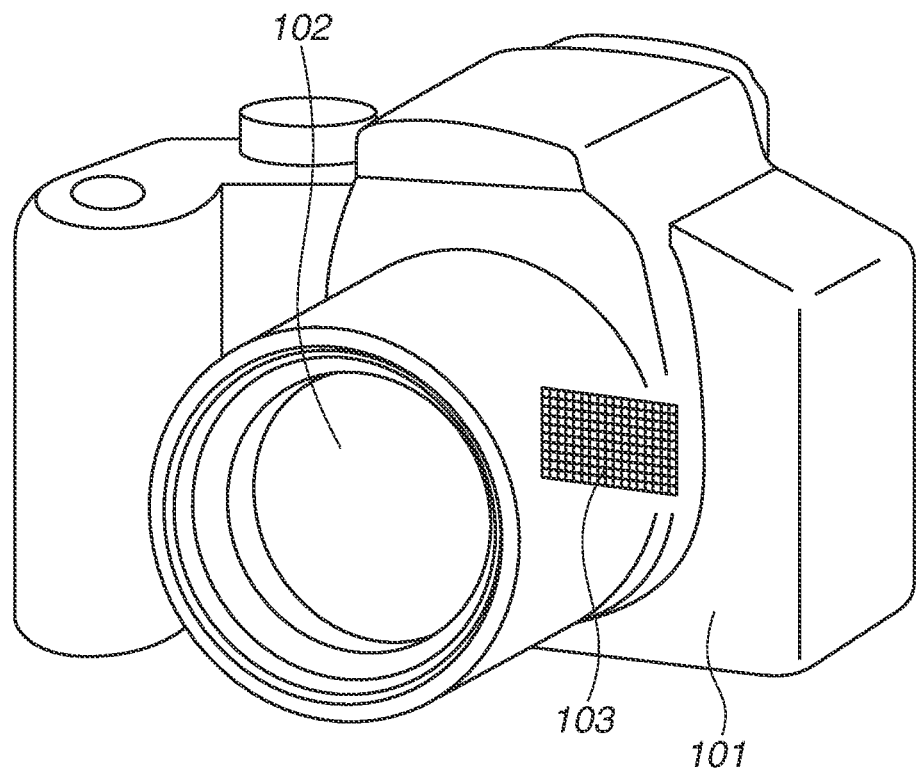
FIG. 9 is a schematic view illustrating an image capturing apparatus according to an exemplary embodiment.

FIG. 9 is a schematic view illustrating an image capturing apparatus (digital still camera) 100 as an optical apparatus according to an exemplary embodiment of the disclosure. The image capturing apparatus 100 according to the present exemplary embodiment includes a camera body 101, an optical system 102, which has a configuration similar to that of any one of the optical systems according to the first to eighth exemplary embodiments described above, and a light receiving element (image sensor) 103 that photoelectrically converts an image formed by the optical system 102.

The image capturing apparatus 100 according to the present exemplary embodiment includes the first and second optical elements according to any one of the exemplary embodiments described above. With this configuration, a variation in the apodization effect due to a variation in in-focus distance can be reduced, and thus an excellent image can be obtained. As the light receiving element 103, an image sensor, such as a CCD sensor or a CMOS sensor, can be used. In this case, the quality of an output image may be improved by electrically correcting various aberrations such as distortion aberration and chromatic aberration of images obtained by the light receiving element 103.

Each of the optical systems according to the first to eighth exemplary embodiments described above is not limited to that of the digital still camera illustrated in FIG. 9, but is also applicable to various optical apparatuses such as a silver halide film camera, a digital video camera, and a telescope.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-192821, filed Oct. 23, 2019, which is hereby incorporated by reference herein in its entirety.

What is claimed is:

1. An optical system comprising:
   an aperture stop;
   a first optical element disposed on an object side of the aperture stop; and
   a second optical element disposed on an image side of the aperture stop,
   wherein each of the first optical element and the second optical element includes an area in which a transmittance changes in a direction perpendicular to an optical axis, and
   wherein the following conditional expressions are satisfied:

$0.60 \leq |m1/a1| < |m2/a2| \leq 1.20$, $0.40 \leq T1(h1)/T2(h2) < 0.98$, $0.30 \leq 2 \times h1/\varphi1 \leq 0.70$, and $0.80 \leq |m1/a1|/|m2/a2| < 1.00$ where a1 is a maximum height from the optical axis of an axial ray in the first optical element, a2 is a maximum height from the optical axis of an axial ray in the second optical element, m1 is a maximum height from the optical axis of an outermost off-axis ray in the first optical element, m2 is a maximum height from the optical axis of an outermost off-axis ray in the second optical element, T1(h) is a transmittance of the first optical element at a height h from the optical axis, T2(h) is a transmittance of the second optical element at the height h from the optical axis, $\varphi1$ is an effective diameter of the first optical element, $\varphi2$ is an effective diameter of the second optical element, and ray heights h1 and h2 satisfy $h1/\varphi1 = h2/\varphi2$.

2. The optical system according to claim 1, wherein the following conditional expression is satisfied:

$0.80 \leq T1(\varphi1/2)/T2(\varphi2/2) < 1.20$.

3. The optical system according to claim 1, wherein the following conditional expression is satisfied:

$0 < (|m1/a1| - 1) \times (|m2/a2| - 1)$.

4. The optical system according to claim 1, wherein the following conditional expressions are satisfied:

$0.000 \leq T1(\varphi1/2) \leq 0.125$, and $0.000 \leq T2(\varphi2/2) \leq 0.125$.

5. The optical system according to claim 1, wherein the following conditional expressions are satisfied:

$0.60 \leq |m1/a1| < 1.00$, and $0.60 \leq |m2/a2| < 1.00$.

6. The optical system according to claim 1, wherein the following conditional expression is satisfied:

$0.20 \leq Dm/Da \leq 0.70$ where Da is a diameter of axial rays in a meridional section at a position of the aperture stop, and Dm is a diameter of outermost off-axis rays in the meridional section at the position of the aperture stop.

7. The optical system according to claim 1, wherein the following conditional expression is satisfied:

$|n1 - n2| \leq 0.32$ where n1 is a refractive index at a d-line of the first optical element, and n2 is a refractive index at a d-line of the second optical element.

8. The optical system according to claim 1, further comprising:
   a first lens unit having a positive refractive power;
   a second lens unit including the aperture stop and having a positive refractive power; and
   a third lens unit, the first lens unit, the second lens unit, and the third lens unit being disposed in order from the object side to the image side,
   wherein the second lens unit includes the first optical element and the second optical element, and
   wherein in focusing from an infinite distance to a closest distance, the first lens unit and the third lens unit are immovable and the second lens unit is movable to the object side.

9. The optical system according to claim 1, further comprising:
   a first lens unit having a positive refractive power;
   a second lens unit including the aperture stop and having a positive refractive power; and
   a third lens unit, the first lens unit, the second lens unit, and the third lens unit being disposed in order from the object side to the image side,
   wherein the first lens unit includes one of the first optical element and the second optical element, and the second lens unit includes the other of the first optical element and the second optical element, and wherein in focusing from an infinite distance to a closest distance, the first lens unit and third lens unit are immovable and the second lens unit is movable to the object side.

10. The optical system according to claim 1, further comprising:
   a first lens unit including the aperture stop and having a positive refractive power;
   a second lens unit having a negative refractive power; and
   a third lens unit, the first lens unit, the second lens unit, and the third lens unit being disposed in order from the object side to the image side,
   wherein the first lens unit includes one of the first optical element and the second optical element, and the third lens unit includes the other of the first optical element and the second optical element, and
   wherein in focusing from an infinite distance to a closest distance, the first lens unit and the third lens unit are immovable and the second lens unit is movable to the image side.

11. The optical system according to claim 1, further comprising:
   a first lens unit having a negative refractive power;
   a second lens unit having a positive refractive power; and
   a third lens unit including the aperture stop and having a positive refractive power, the first lens unit, the second lens unit, and the third lens unit being disposed in order from the object side to the image side,
   wherein the second lens unit includes one of the first optical element and the second optical element, and the third lens unit includes the other of the first optical element and the second optical element, and
   wherein in focusing from an infinite distance to a closest distance, the first lens unit is immovable and the second lens unit and the third lens unit are movable to the object side, and an interval between the second lens unit and the third lens unit varies.

12. An optical apparatus comprising:
   the optical system according to claim 1; and
   an image sensor configured to receive light as an image formed by the optical system.

13. An optical system comprising:
   an aperture stop;
   a first optical element disposed on one of an object side and an image side of the aperture stop; and
   a second optical element disposed on the other of the object side and the image side,
   wherein each of the first optical element and the second optical element includes an area in which a transmittance changes in a direction perpendicular to an optical axis, and
   wherein the following conditional expressions are satisfied:

$|m1/a1| < |m2/a2|$, $0.40 \leq T1(h1)/T2(h2) < 0.98$, $0.30 \leq 2 \times h1/\varphi1 \leq 0.70$, $0.60 \leq |m1/a1| < 1.00$, and $0.60 \leq |m2/a2| < 1.00$ where a1 is a maximum height from the optical axis of an axial ray in the first optical element, a2 is a maximum height from the optical axis of an axial ray in the second optical element, m1 is a maximum height from the optical axis of an outermost off-axis ray in the first optical element, m2 is a maximum height from the optical axis of an outermost off-axis ray in the second optical element, T1(h) is a transmittance of the first optical element at a height h from the optical axis, T2(h) is a transmittance of the second optical element at the height h from the optical axis, $\varphi1$ is an effective diameter of the first optical element, $\varphi2$ is an effective diameter of the second optical element, and ray heights h1 and h2 satisfy $h1/\varphi1 = h2/\varphi2$.

14. An optical apparatus comprising:
   the optical system according to claim 13; and
   an image sensor configured to receive light as an image formed by the optical system.

* * * * *